May 22, 1923.  1,456,436

A. HELDRICH

TYPOGRAPHICAL MACHINE

Filed April 4, 1921  17 sheets-sheet 1

Witnesses

Inventor
Andrew Heldrich,
By
Attorney

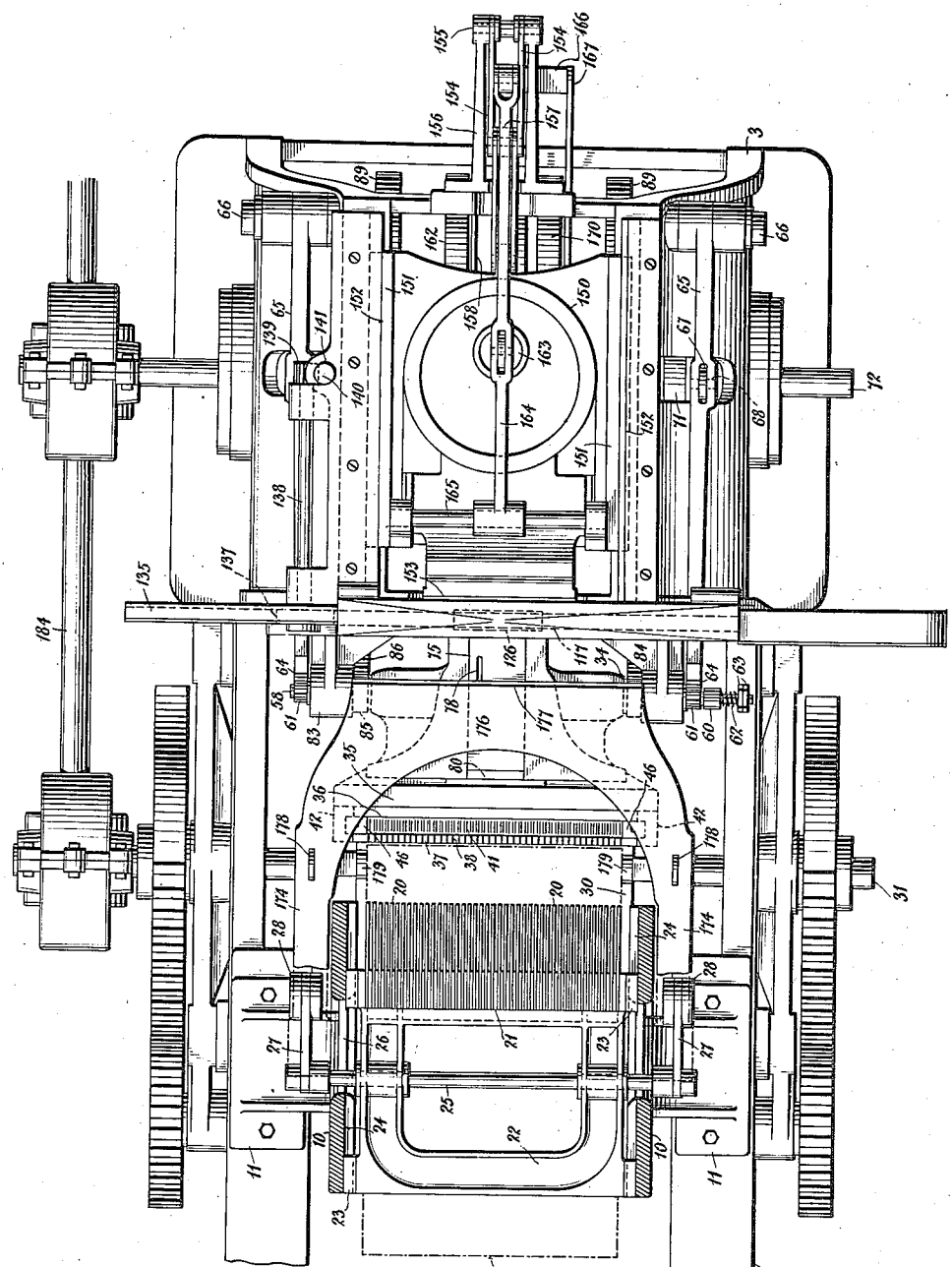

May 22, 1923.
A. HELDRICH
TYPOGRAPHICAL MACHINE
Filed April 4, 1921
1,456,436
17 sheets-sheet 3
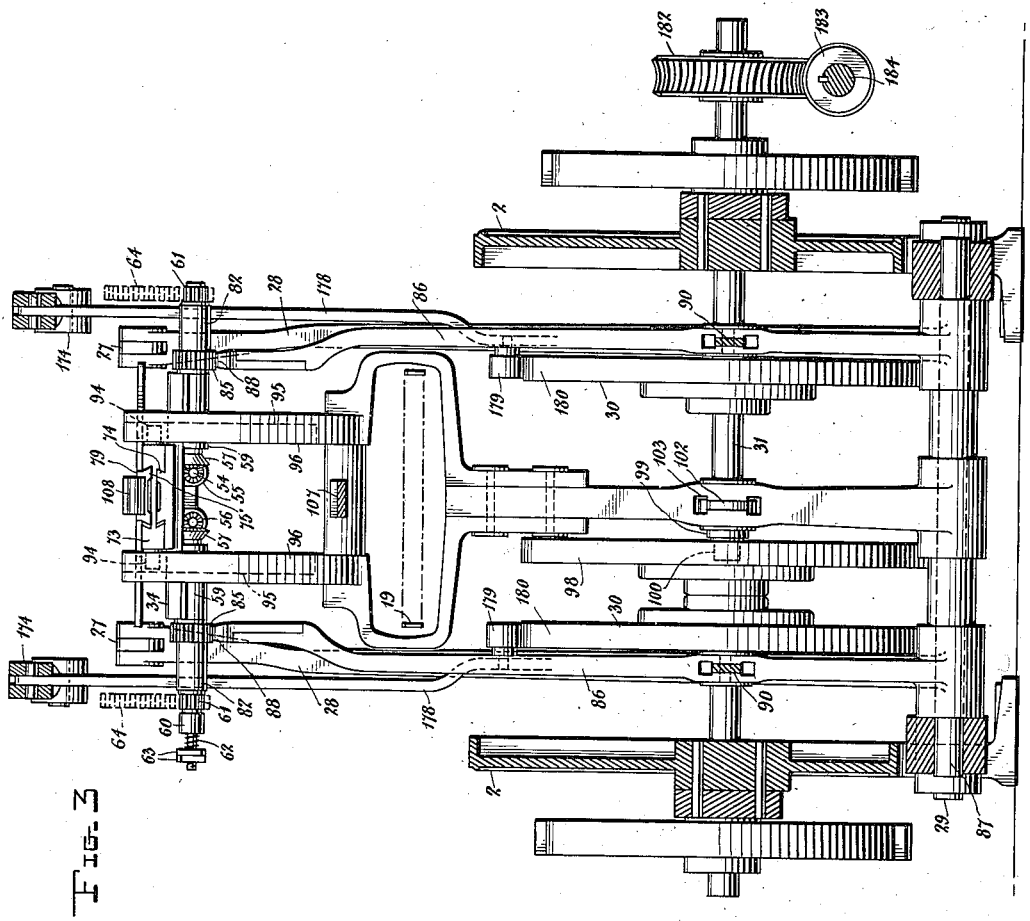
Inventor
Andrew Heldrich,

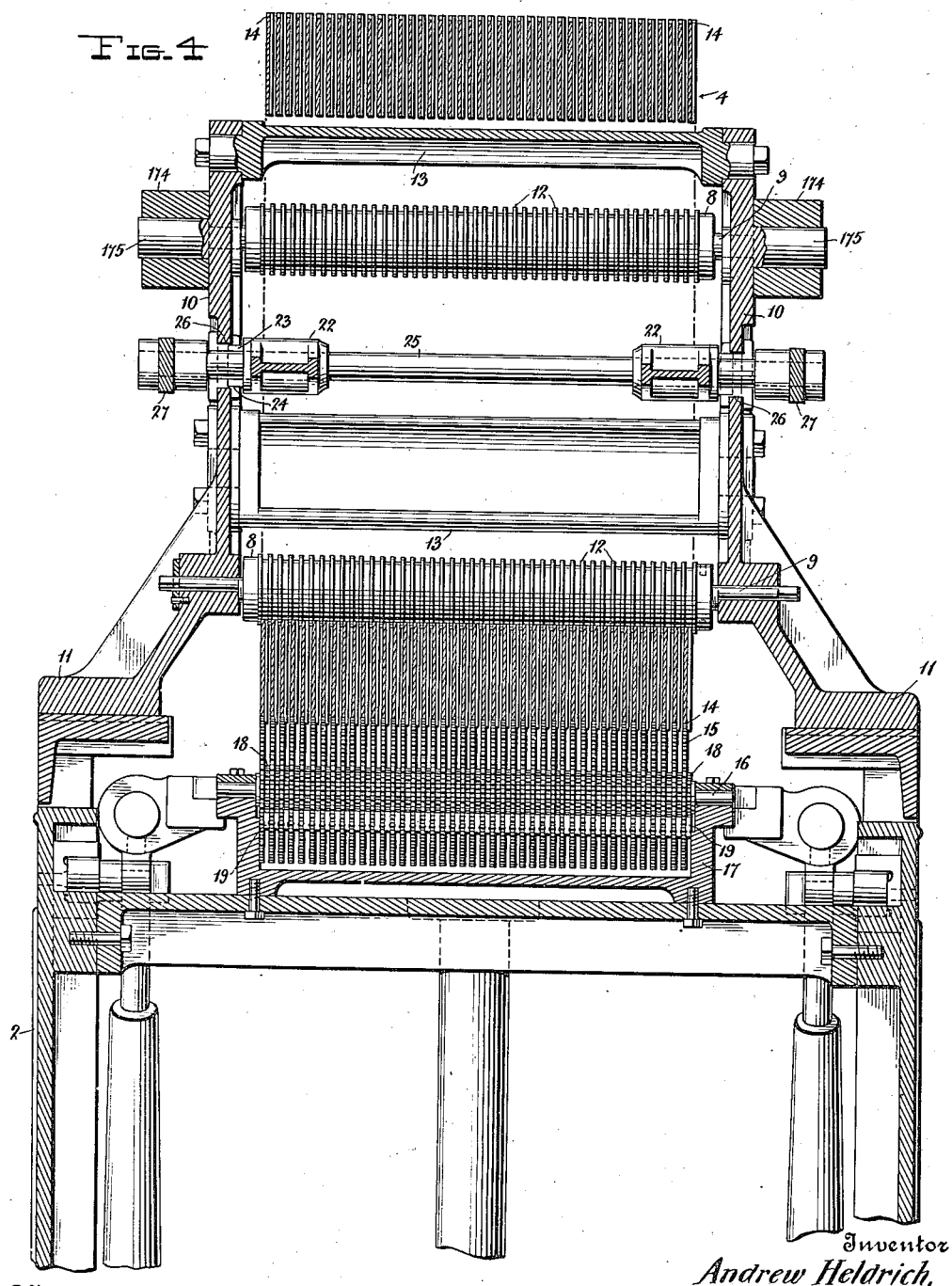

May 22, 1923.
A. HELDRICH
TYPOGRAPHICAL MACHINE
Filed April 4, 1921
1,456,436
17 sheets-sheet 5
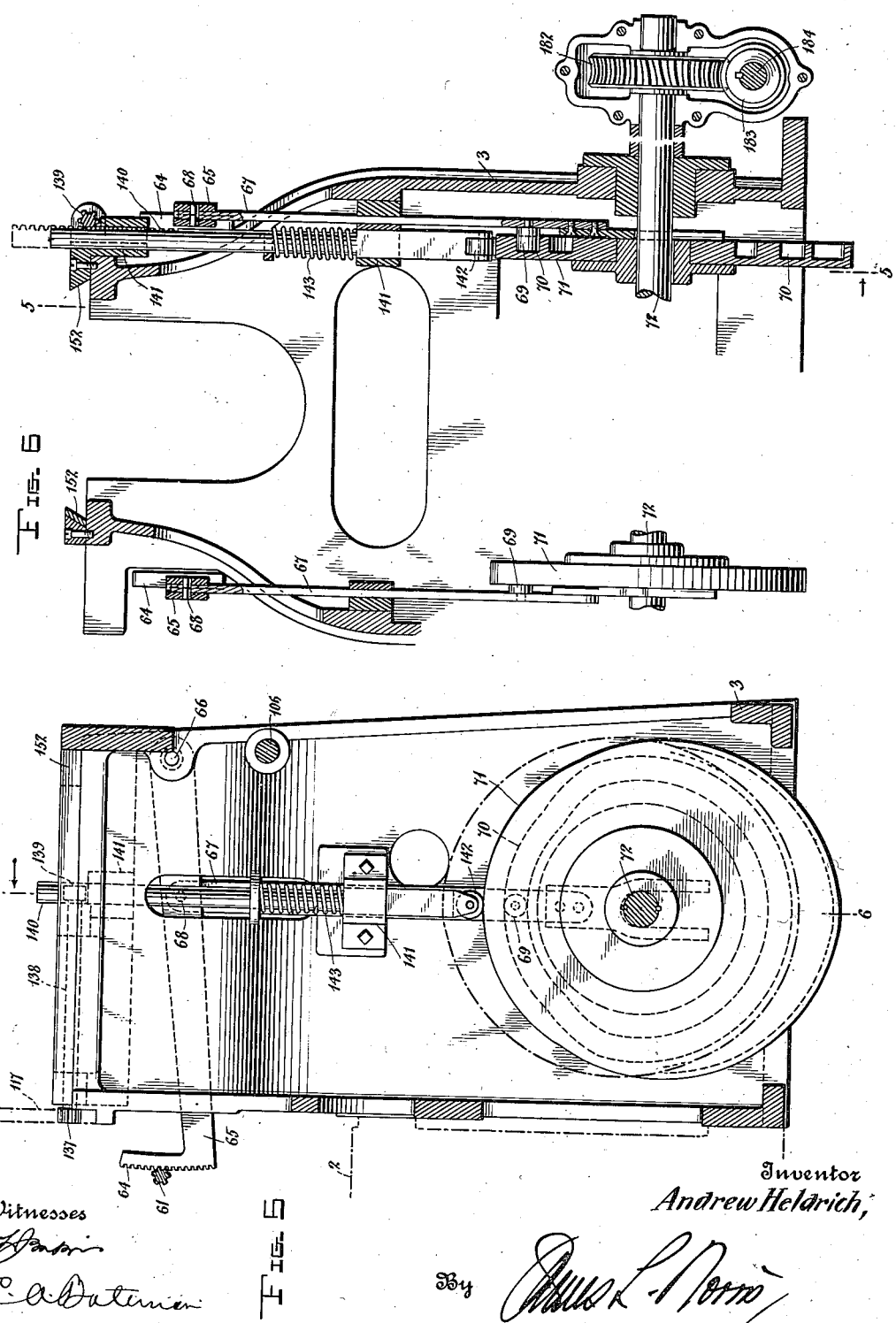

May 22, 1923.  1,456,436
A. HELDRICH
TYPOGRAPHICAL MACHINE
Filed April 4, 1921   17 sheets-sheet 6
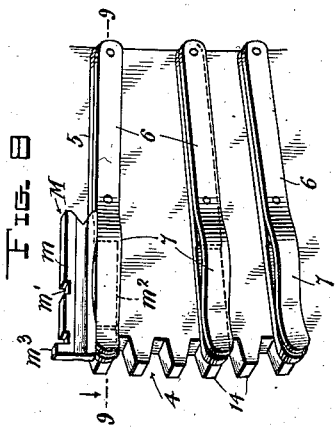
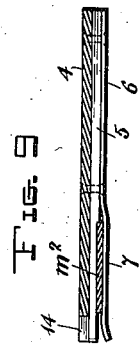
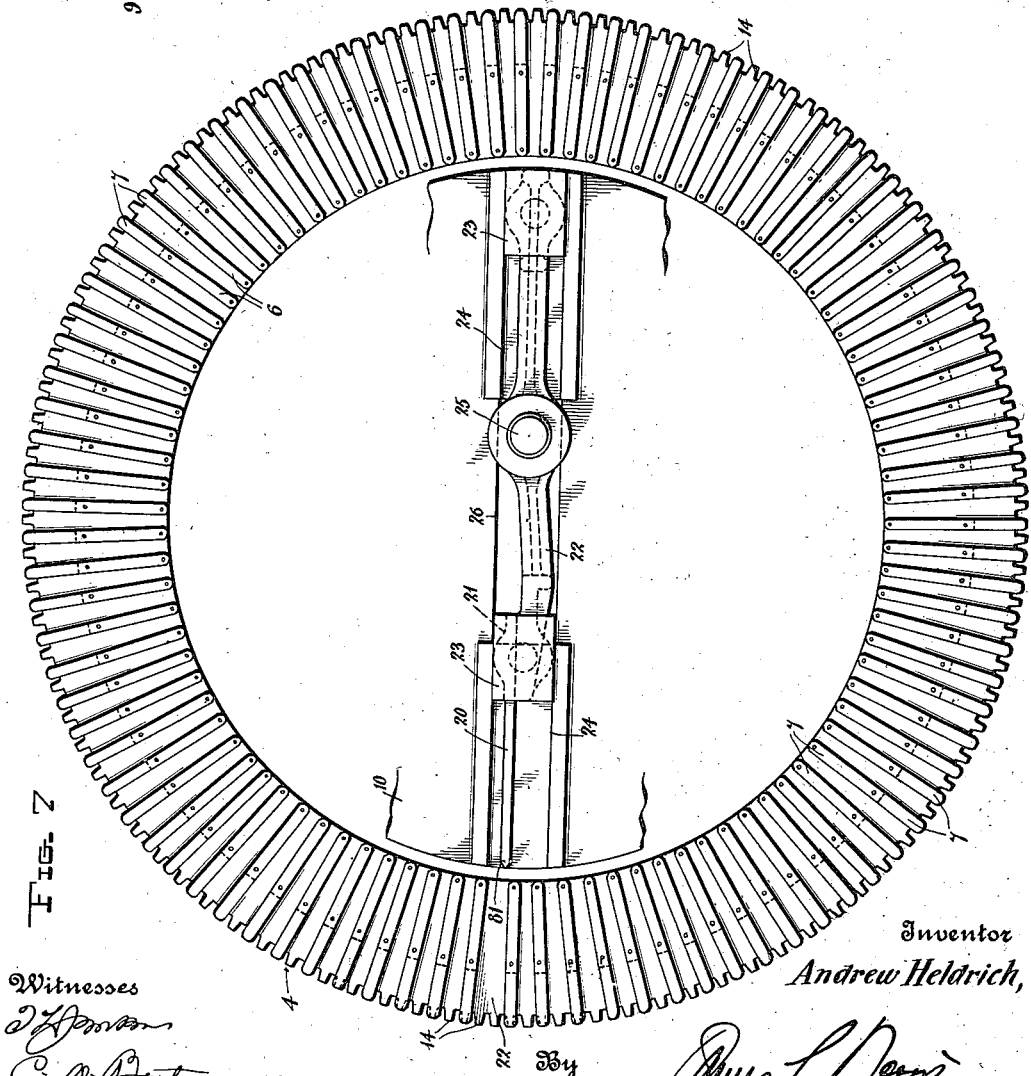
Inventor
Andrew Heldrich,
By
Attorney
Witnesses May 22, 1923.
A. HELDRICH
1,456,436
TYPOGRAPHICAL MACHINE
Filed April 4, 1921
17 sheets-sheet 7
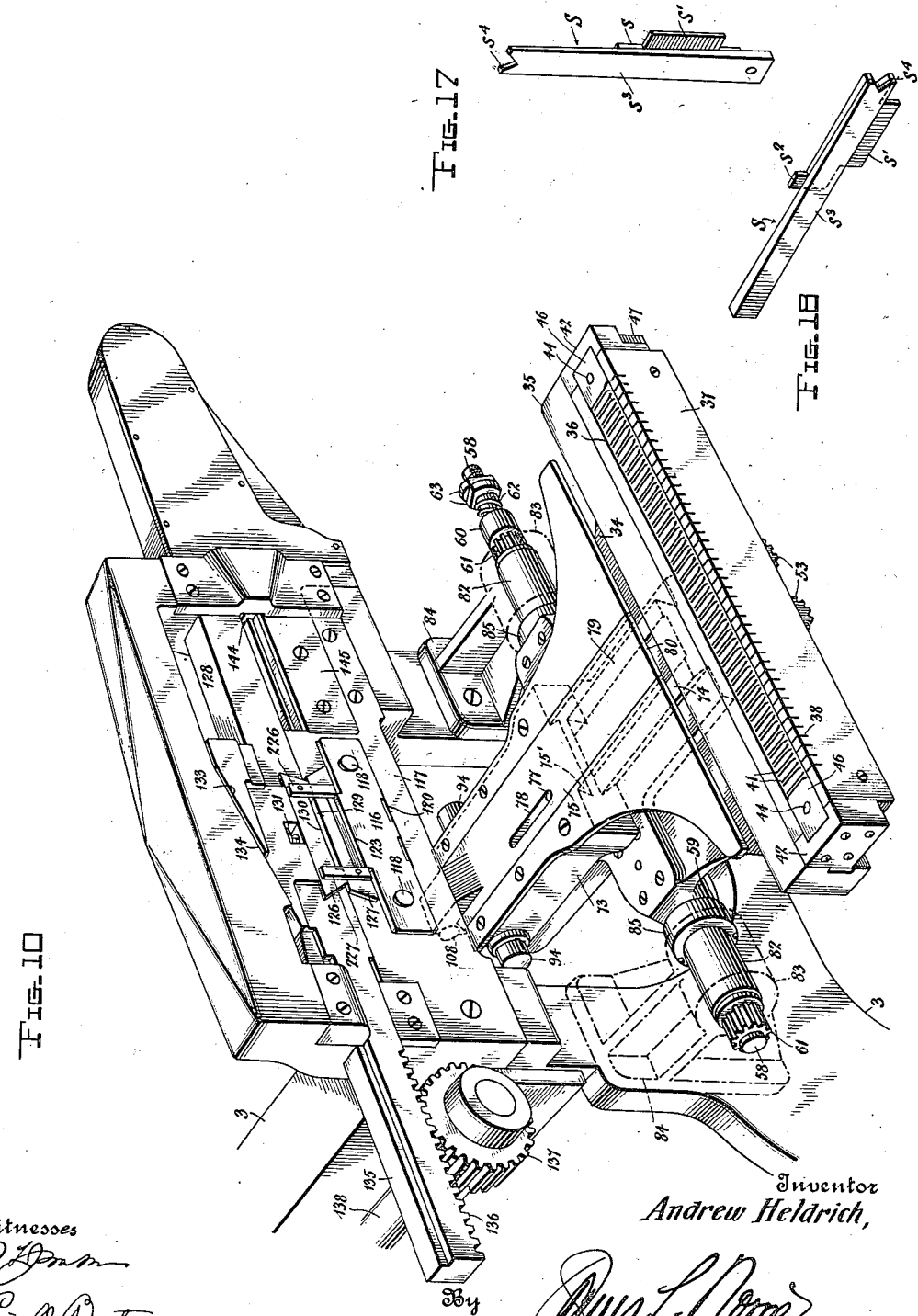
Witnesses
Inventor
Andrew Heldrich,
By
Attorney

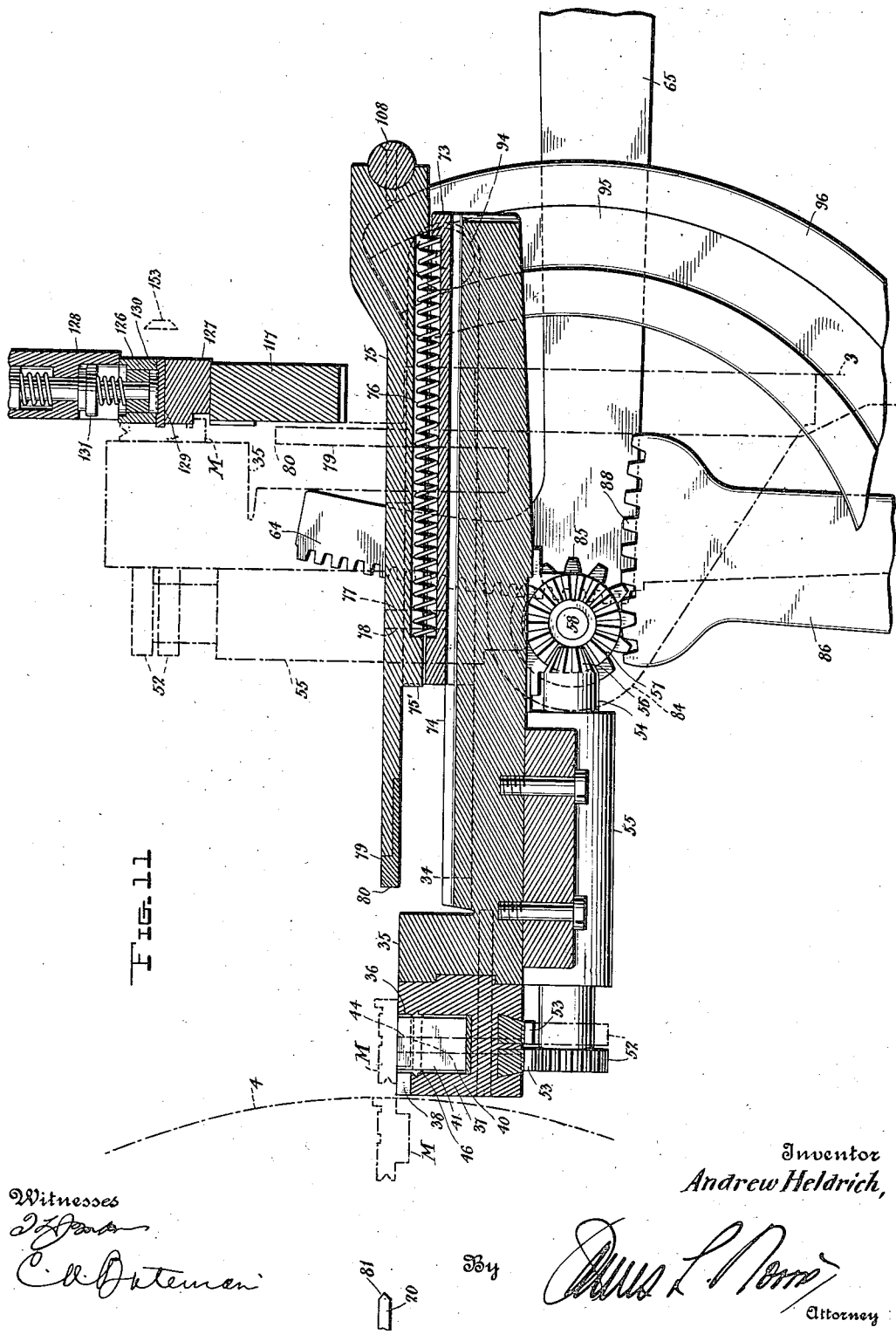

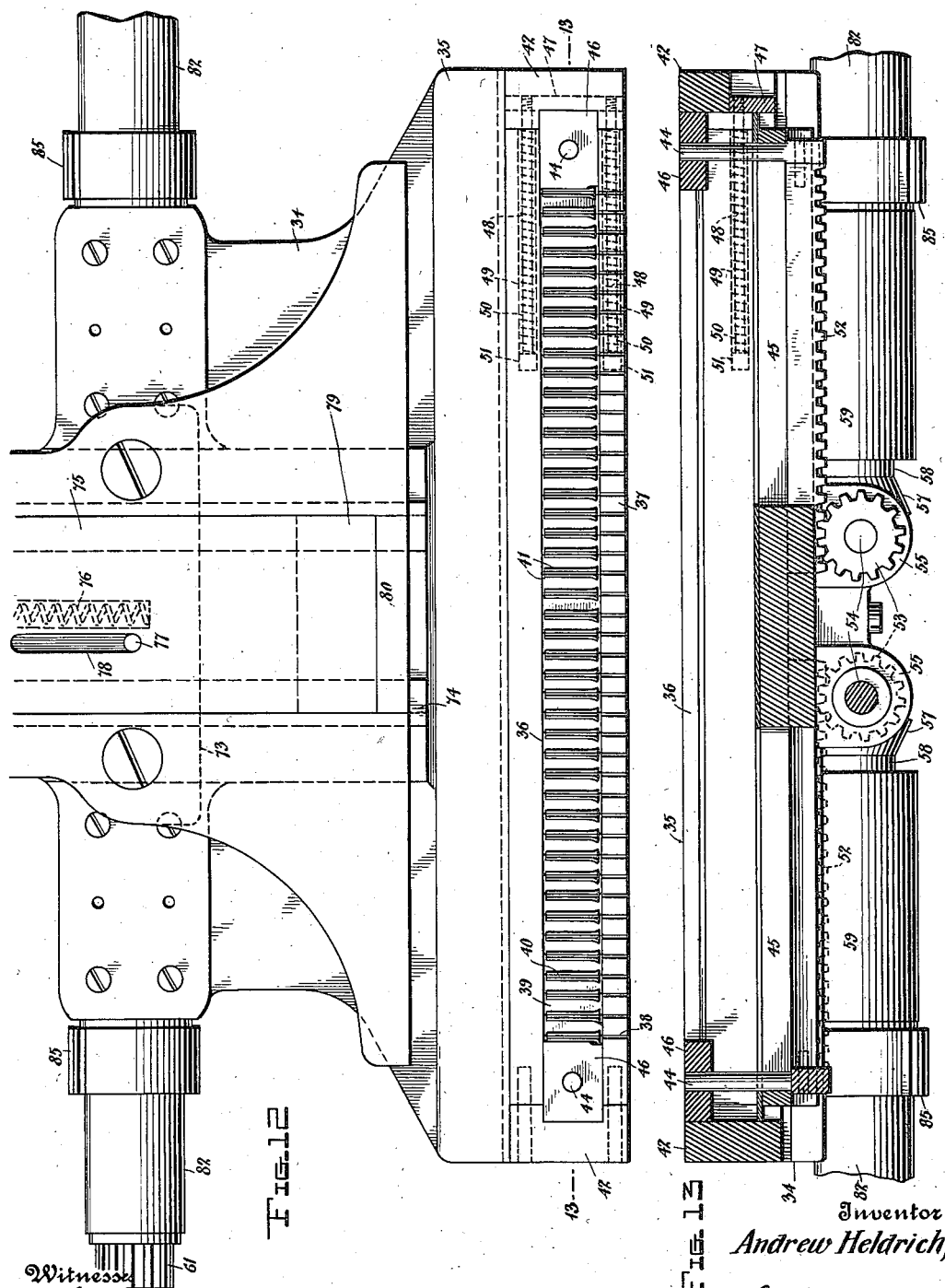

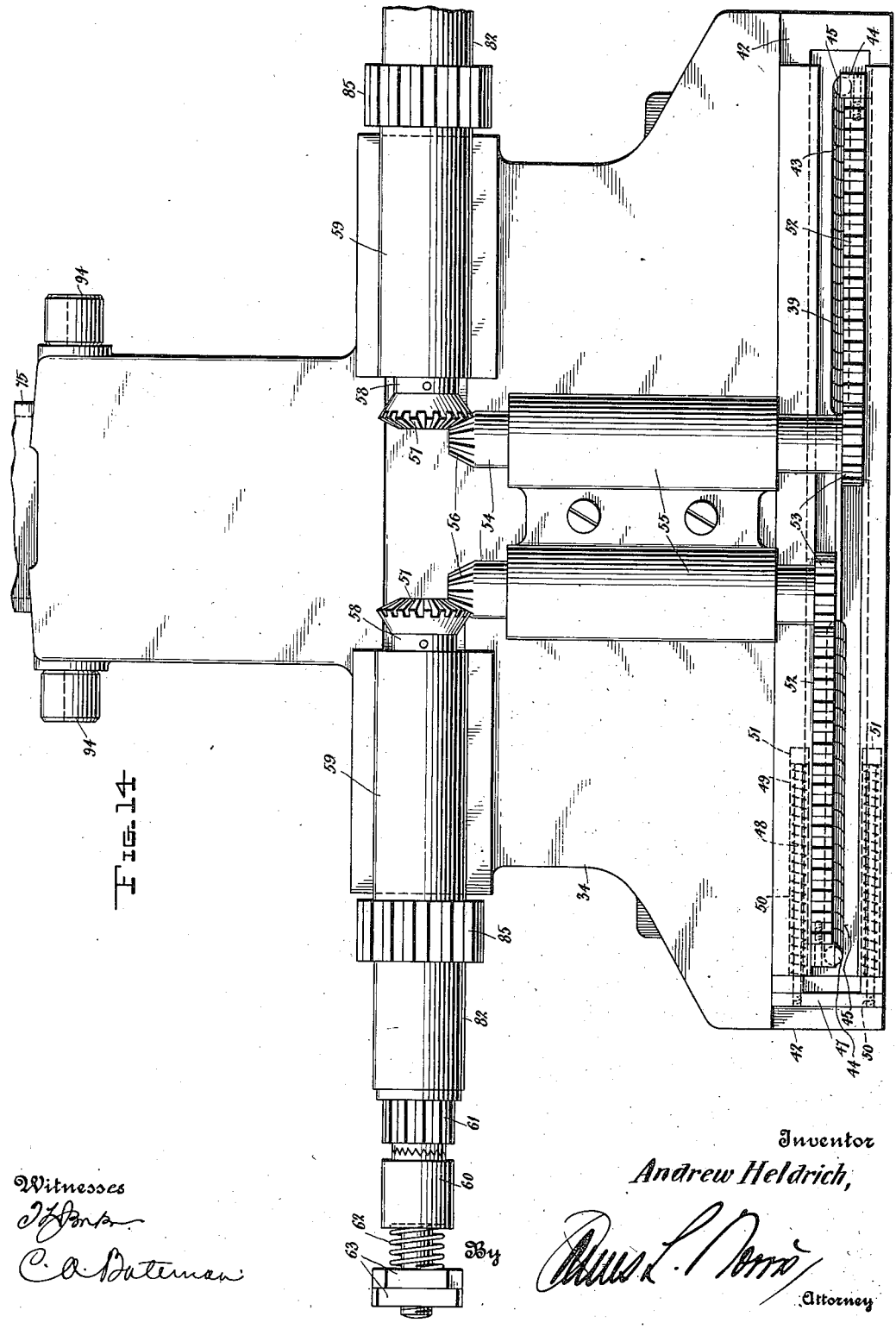

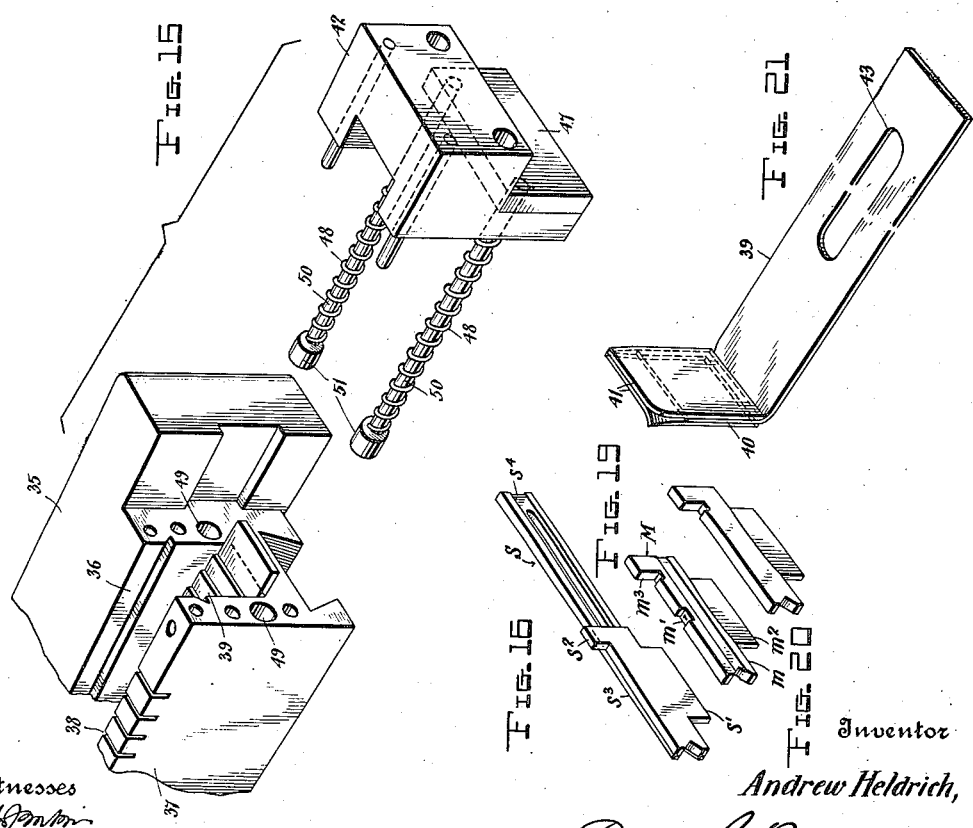

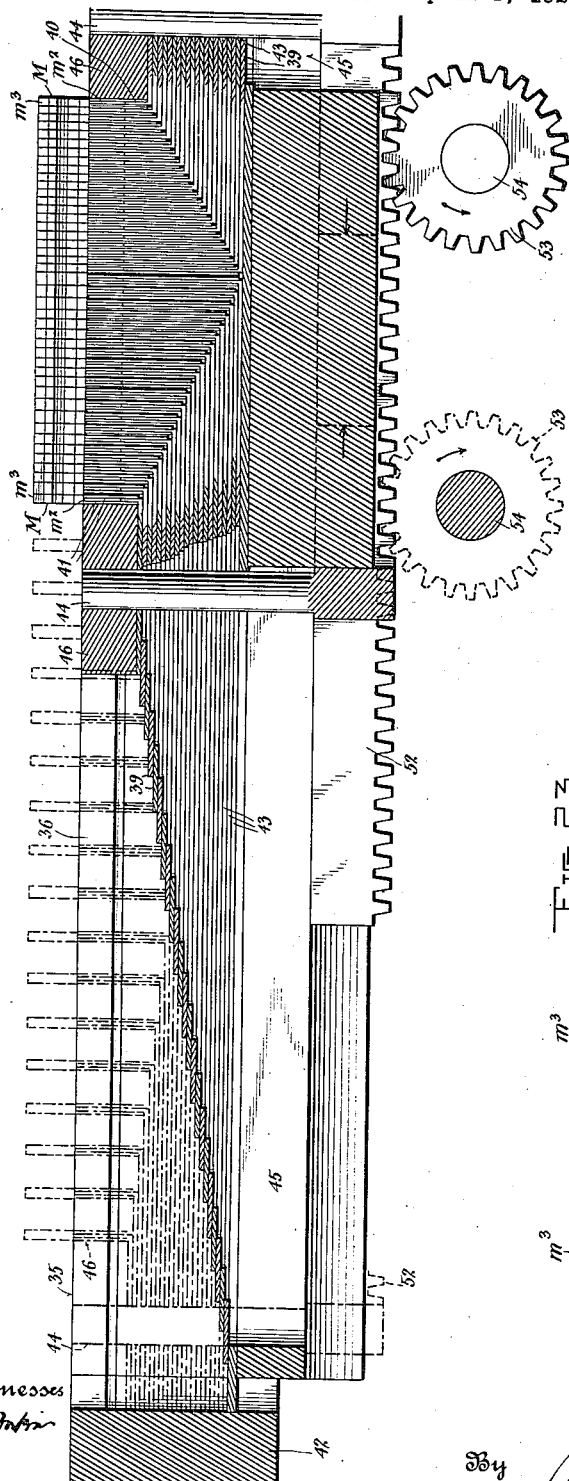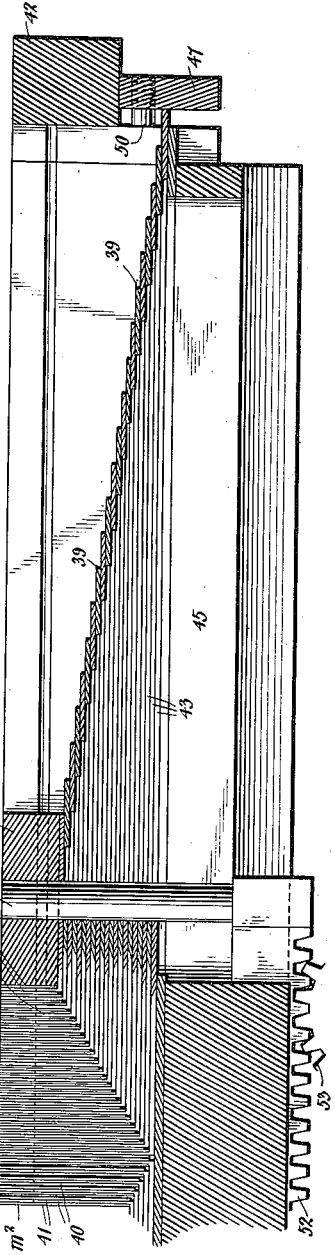

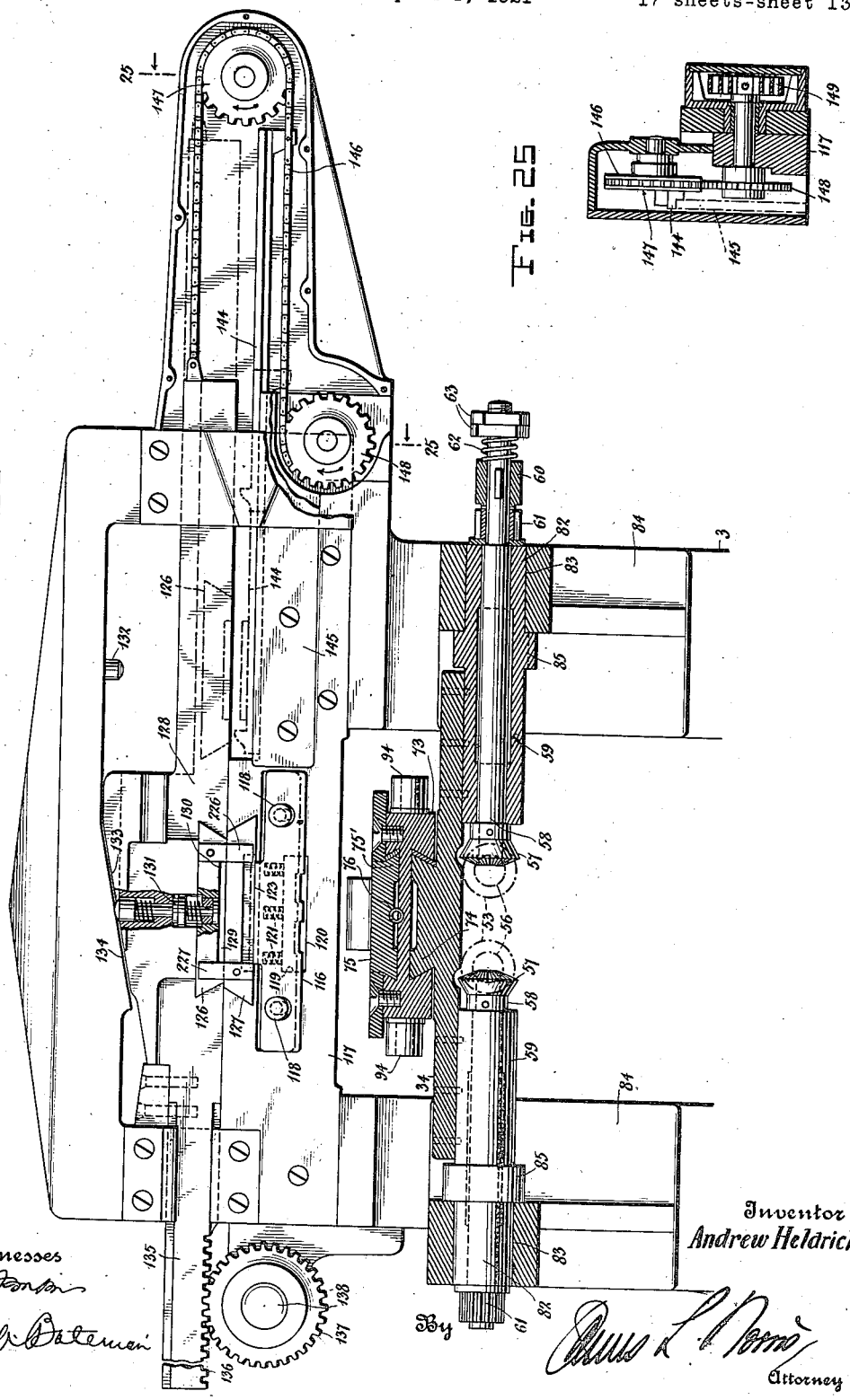

May 22, 1923.
A. HELDRICH
1,456,436
TYPOGRAPHICAL MACHINE
Filed April 4, 1921
17 sheets-sheet 14
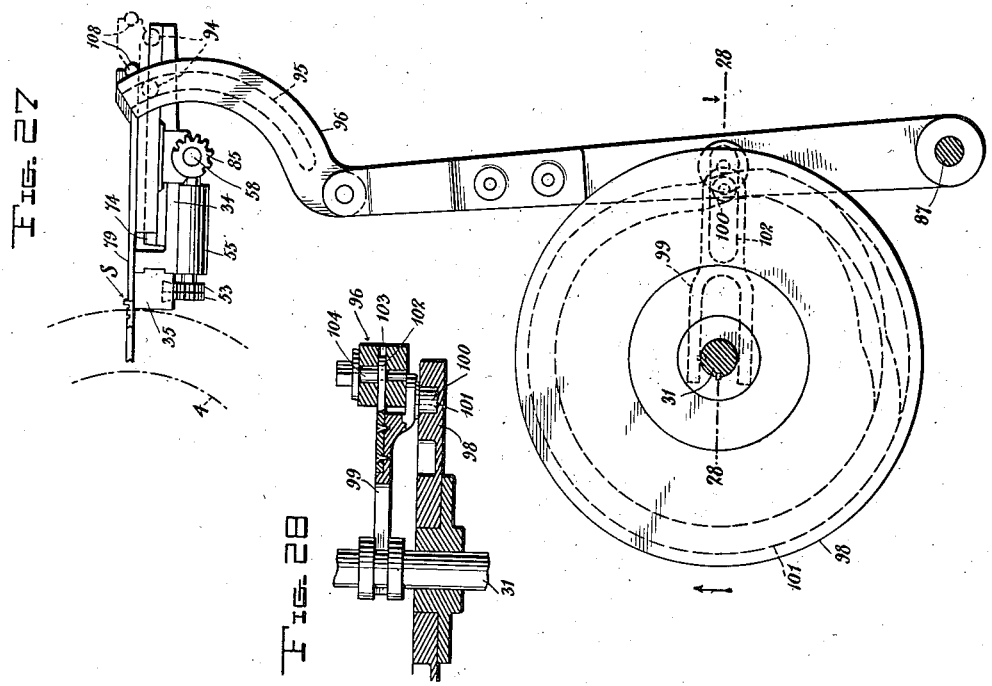
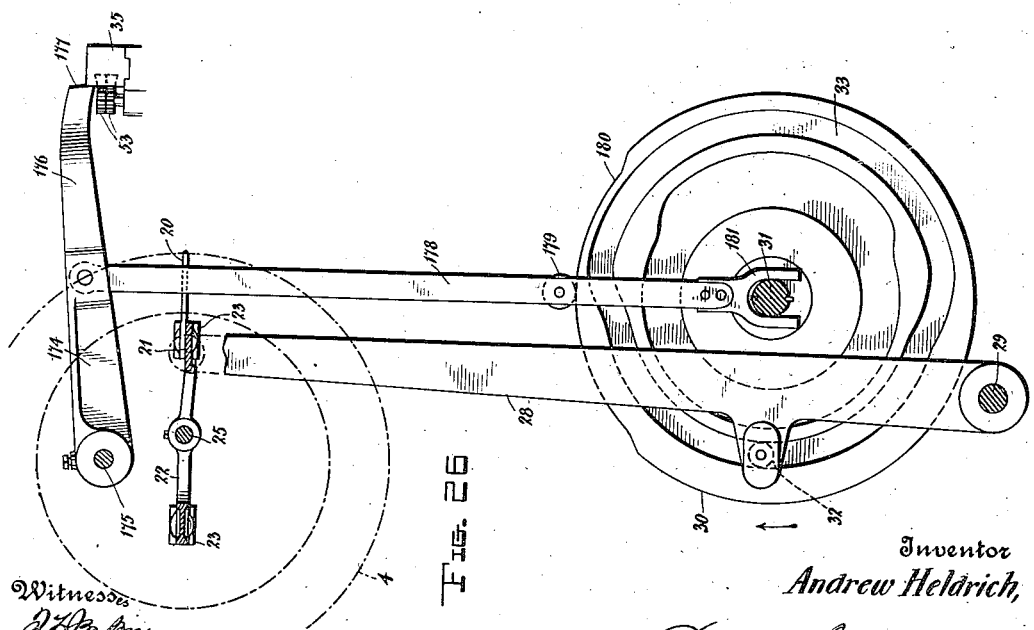
Inventor
Andrew Heldrich, May 22, 1923.
A. HELDRICH
TYPOGRAPHICAL MACHINE
Filed April 4, 1921
1,456,436
17 sheets-sheet 15
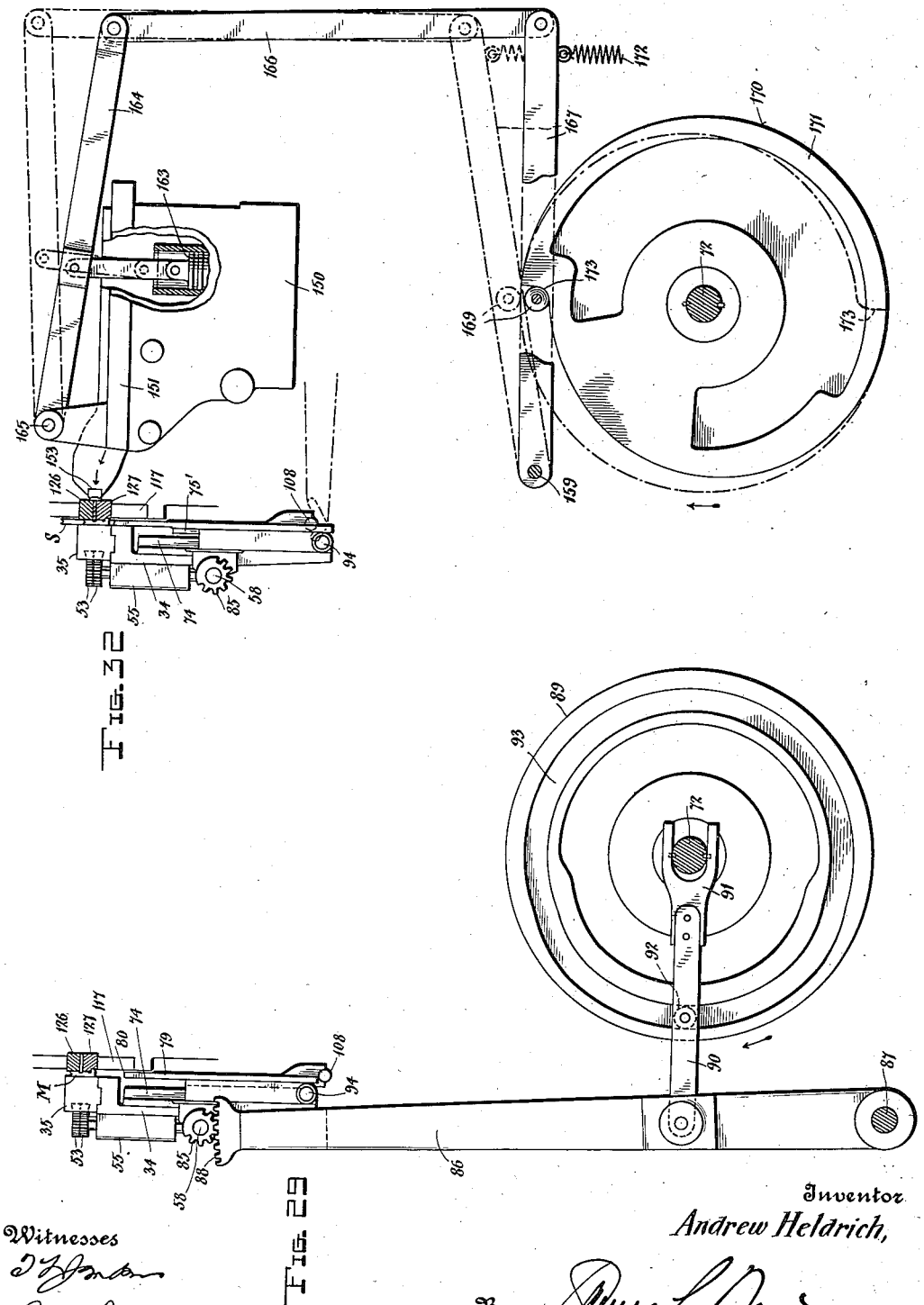
Inventor
Andrew Heldrich,
Witnesses
By
Attorney May 22, 1923.
A. HELDRICH
TYPOGRAPHICAL MACHINE
Filed April 4, 1921
1,456,436
17 sheets-sheet 16
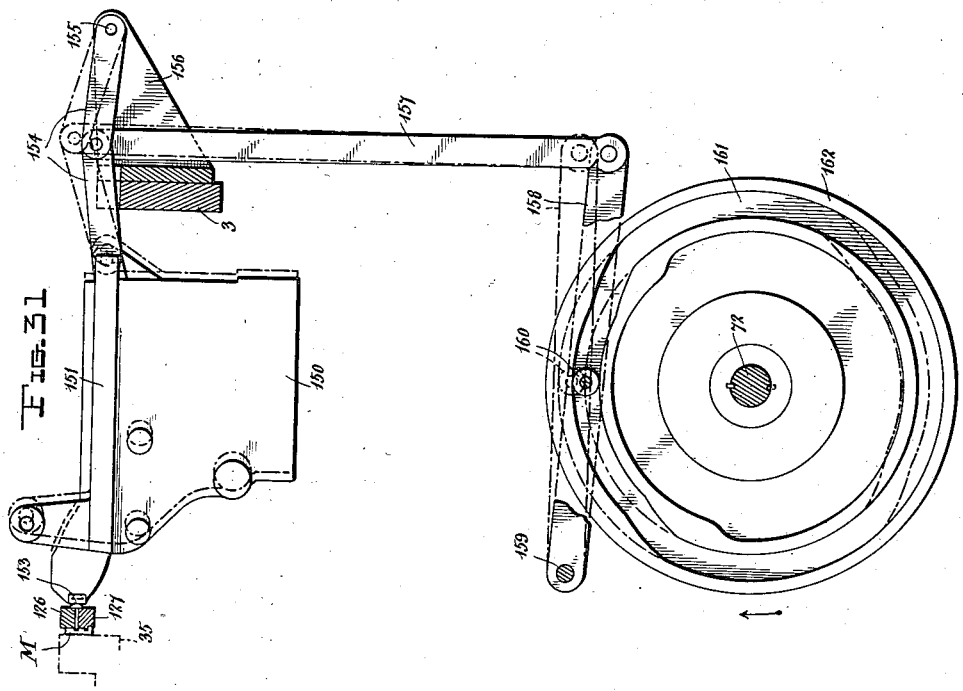
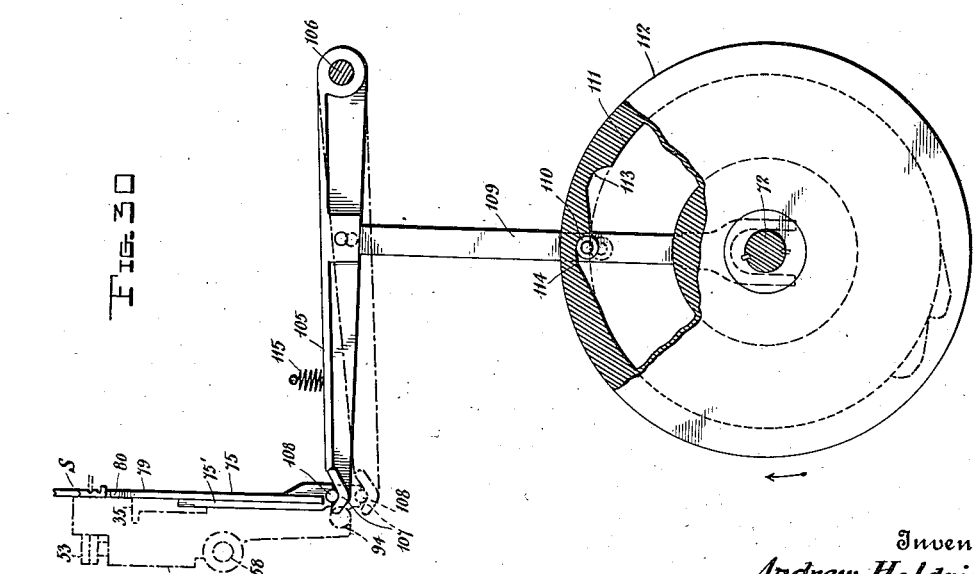
Inventor
Andrew Heldrich,
By
Attorney

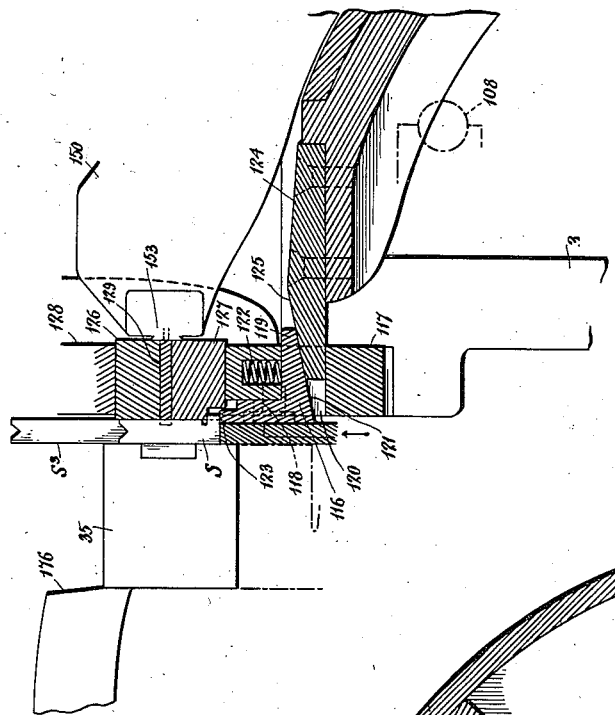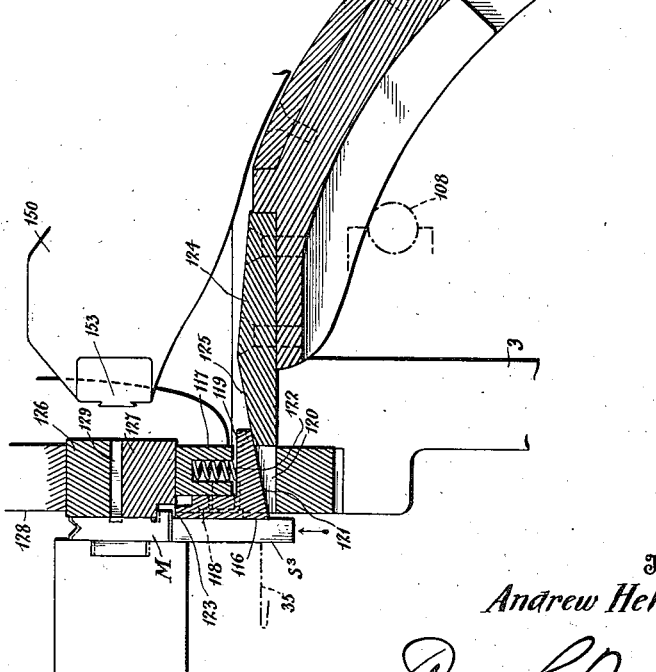

Patented May 22, 1923.

1,456,436

UNITED STATES PATENT OFFICE.

ANDREW HELDRICH, OF PHILADELPHIA, PENNSYLVANIA, ASSIGNOR TO CADE MANUFACTURING COMPANY, OF SHELBY, NORTH CAROLINA, A CORPORATION OF NORTH CAROLINA.

TYPOGRAPHICAL MACHINE.

Application filed April 4, 1921. Serial No. 458,447.

*To all whom it may concern:*

Be it known that I, ANDREW HELDRICH, a citizen of the United States, residing at Philadelphia, in the county of Philadelphia and State of Pennsylvania, have invented new and useful Improvements in Typographical Machines, of which the following is a specification.

The present invention relates to improvements in typographical machines and more especially to line-composing and type-casting machines of the class embodying a set of rotatable or shiftable magazines containing fonts of matrices and spacers, in conjunction with means for causing rotation of the different magazines to bring the selected matrices or spacers therein to a common assembling point to compose a line which is justified and then presented to a mold for the casting of a type slug therefrom, machines of this general class being shown and described, for example, in the prior patents to Baylus Cade Nos. 1,084,395, granted January 13, 1914, and 1,257,185, granted February 19, 1918, and the patent to Baylus Cade and myself No. 1,035,416, granted August 13, 1912.

The primary object of the invention is to provide a novel and improved machine of the kind referred to, wherein the matrices and spacers are removable or detachable from their respective magazines and are received by and assembled in a matrix-gatherer, the gathered matrices and spacers being then presented to a mold and after justification, a type slug is cast from the line, the matrices and spacers being subsequently returned to their proper places in the respective magazines, the magazines being then in readiness for operation to bring the matrices and spacers selected to form the next line, to the gatherer.

Another object of the invention is to provide a novel and improved matrix-gatherer which is capable of receiving the selected matrices and spacers from a row of magazines and of gathering together the matrices and spacers so that the bodies thereof are brought together in compact contacting relation preparatory to a cast, the line of matrices and spacers being so gathered as to enable it to be clamped endwise by a vise to maintain the bodies of the matrices and spacers in sufficiently close relation to enable a cast to be made directly therefrom, as is usually done in line casting machines, the gatherer being also capable of separating the bodies of the matrices and spacers to bring them into their initially spaced relation, thus enabling them to be returned to their proper places in the respective magazines.

Another object of the invention is to provide a matrix or line gatherer of the kind described, with means whereby the matrices and spacers composing the line, are equalized and compensation is made for variations in the number and the aggregate thickness of matrices contained in each half of the line measure.

A further object of the invention is to provide a gatherer with cooperative slides or equivalent members, one of which operates to transfer the selected matrices and spacers from the magazine to the gatherer, and the other of which operates to return the matrices and spacers from the gatherer to the magazines.

Other objects of the invention are to provide novel and improved means for justifying the line of matrices and spacers, for alining the matrices relatively to the mold, and to provide novel and improved means for otherwise handling or manipulating the line to prepare it for the casting of a type slug therefrom.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 2 is a top plan view of the mechanism shown in Figure 1;

Figure 3 represents a transverse vertical section on the line 3—3 of Figure 1, and looking in the direction of the arrows;

Figure 4 represents, on an enlarged scale, a transverse section on the line 4—4 of Figure 1, and looking in the direction of the arrows;

Figure 5 represents a longitudinal vertical section on the line 5—5 of Figure 6, looking in the direction of the arrow;

Figure 6 represents a section on the line 6—6 of Figure 5, looking in the direction of the arrow;

Figure 7 shows in detail and on an enlarged scale, one of the matrix magazines and the cooperative comb or member for transferring a matrix or spacer therefrom to the line-gatherer;

Figure 8 is a detail perspective view, on an enlarged scale, of a portion of the matrix-magazine;

Figure 9 represents a section on the line 9—9 of Figure 8 looking in the direction of the arrow;

Figure 10 is a perspective view of the line-gatherer and the cooperative mold;

Figure 11 represents a section through the line-gatherer and the mold, taken longitudinally of the machine, this figure also showing the cooperative relation between the line-gatherer and the magazines for the transfer of matrices and spacers between these elements of the machine;

Figure 12 is a face view of the line-gatherer;

Figure 13 represents a section on the line 13—13 of Figure 12;

Figure 14 is a bottom plan view of the line-gatherer;

Figure 15 is a detail perspective view showing collectively, but in detached relation, one end of the line-gatherer and the end-piece and extensible abutment:

Figure 16 is a detail perspective view of one of the spacers;

Figures 17 and 18 are perspective views of the spacer showing it in expanded and contracted condition respectively;

Figure 19 is a detail perspective view of one of the matrices;

Figure 20 is a detail perspective view of a quad;

Figure 21 is a detail perspective view of one of the matrix-receivers contained in the gatherer;

Figure 22 represents, on an enlarged scale, a longitudinal section taken through a portion of the matrix-gatherer and showing a line of matrices and spacers gathered together;

Figure 23 represents a section taken longitudinally through the opposite end of the matrix-gatherer, showing the manner in which the matrix-receivers equalize the line of matrices when the aggregate thickness of the matrices in one-half of the line measure exceeds the aggregate thickness of the matrices in the remainder of the line;

Figure 24 shows the mold in elevation and the cooperative matrix-gatherer partly in section;

Figure 25 represents a section on the line 25—25 of Figure 24 and looking in the direction of the arrows;

Figure 26 is a detail diagrammatic view showing the operating means for the comb or member which transfers the matrices and spacers from the magazines to the matrix-gatherer and also showing the operating means for the member which backs up the matrix-gatherer when the mouth of the metal pot is advanced against the mold;

Figure 27 shows the operating means for the slide or member which returns the matrices and spacers from the matrix-gatherer to the magazines;

Figure 28 represents a detail section on the line 28—28 of Figure 27;

Figure 29 shows the operating means for swinging the matrix-gatherer to carry the line to and from cooperative relation with the mold;

Figure 30 shows the justifying means;

Figure 31 illustrates the means for advancing the metal pot to bring its mouthpiece into cooperative relation with the mold;

Figure 32 shows the means for actuating the metal-injecting pump of the metal pot;

Figures 33 and 34 show in detail the alining means which brings the line of matrices into alinement relatively to the mold.

Similar parts are designated by the same reference characters in the several views.

Figure 1:
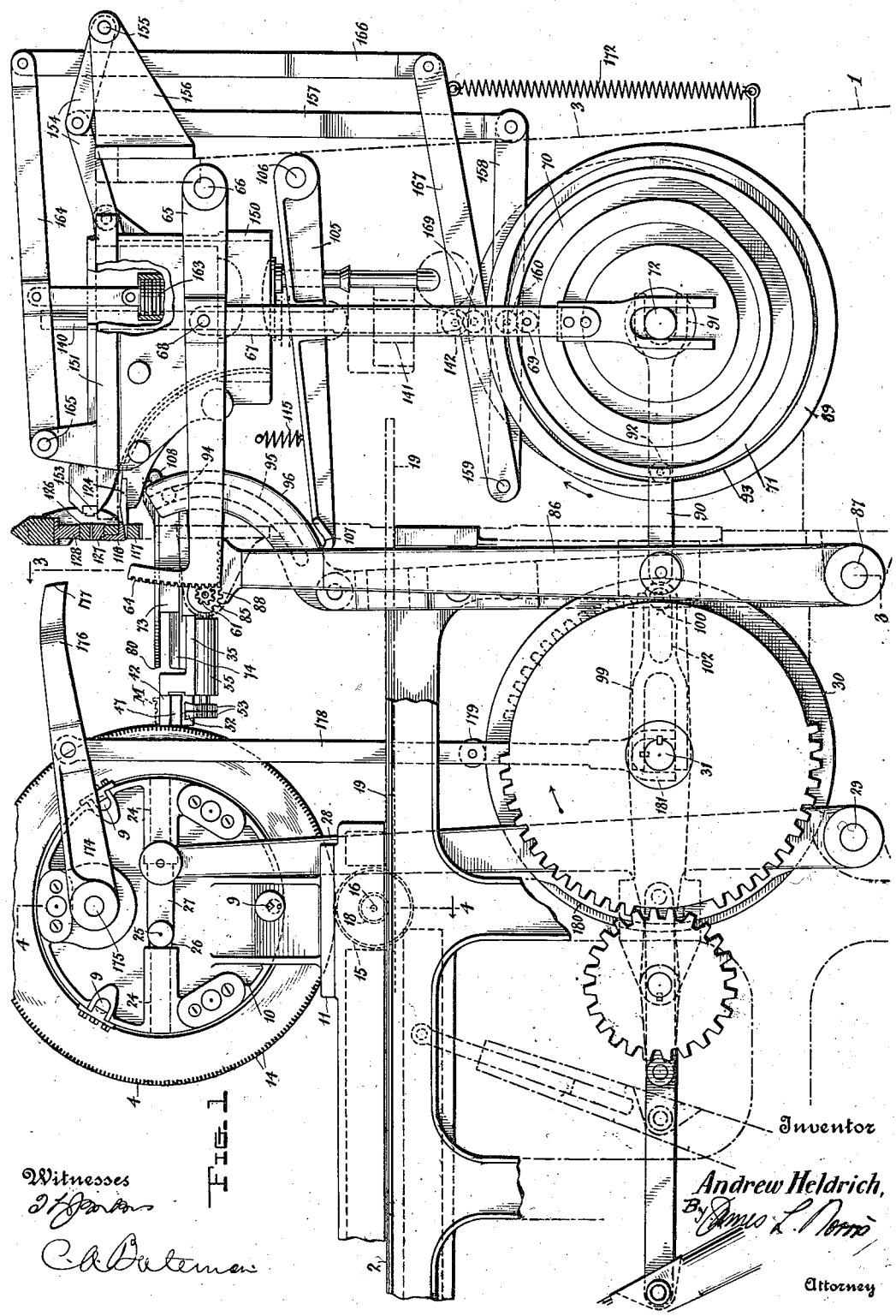
Figure 1 represents a side elevation of a portion of a line-composing and type-casting machine constructed in accordance with the present invention.

The improvements hereinafter described and claimed are applicable generally to line-composing and type-casting machines of the class wherein the matrices and spacers are contained in rotatable, or otherwise shiftable, magazines arranged in a row, the magazines rotating or shifting, under the control of a suitable keyboard mechanism to bring the selected matrices or spacers to a common line for assembly, the patents to Baylus Cade, No. 1,084,395, granted January 13, 1914, and No. 1,257,185, granted February 19, 1918, and the patent to Baylus Cade and myself No. 1,035,416, granted August 13, 1912, being examples of machines of this general class, the present invention being particularly devised as an improvement upon the machines shown and described in the patents referred to. The preferred embodiment of the invention is shown in the accompanying drawings and will be hereinafter described in detail. It is to be understood, however, that the invention is not restricted to the precise construction shown and described, as equivalent constructions are contemplated, and these will be included within the scope of the claims.

The machine in the present instance comprises a suitable base 1 which supports appropriate frames which contain the different elements of the machine and their operating mechanisms, the frame 2 supporting the keyboard and related matrix-selecting means (which forms no part of the invention herein claimed), the matrix magazines, and the matrix-gatherer, together with their operating mechanisms, and the frame 3 supporting the casting apparatus and its operating mechanism. The matrix magazines may be constructed in different ways, but they are preferably composed of a series of annular members or plates 4, assembled in a row side-by-side on a common axis. Each annular member or plate 4, according to the present invention, is constructed to contain a font or set of matrices and an expansible spacer, each matrix M (Figs. 8 and 19) comprising a body $m$ having preferably parallel flat sides, a character $m'$ in one edge of the body, and a narrowed or reduced fin or tongue $m^2$ projecting from the opposite edge of its body, each matrix also having a lug $m^3$ projecting beyond the character-bearing edge of its body. In the present instance, one face of each annular member or plate 4 is provided with a series of substantially radially-extending bars 5 forming spaces between them, into which matrices may be introduced from their outer end, and a spring 6 is fixed to each bar and is provided with a resilient part 7, beneath which the fin or tongue $m^2$ of the adjacent matrix may enter and be frictionally clamped against the underlying bar 5, as will be clear from Figure 9, each matrix being thereby held in its respective matrix-receiving pocket or space in the member or ring 4, by friction, which will permit any one of these matrices to be removed from or returned to the magazine when sufficient force is applied to such matrix, but the friction will be sufficient to prevent accidental detachment of the matrices from the magazine. At least one of the spaces or pockets in each magazine contains a spacer S which is preferably of the wedge or expansible type, as will be clear from Figures 15, 16 and 18, each spacer comprising a body $s$ which has the general outline of the body of the matrix M, the body having a fin or tongue $s'$ of reduced thickness projecting from one of its edges and a lug $s^2$ projects from its opposite edge, and one side of the body of the spacer is beveled or tapered to receive a tapered member or wedge $s^3$; the wedge and body of the spacer being slidably connected by a dove-tail rib and groove connection $s^4$. It will be understood that when the wedge $s^3$ is shifted relatively to the body of the spacer, as shown in Figure 17, the effective thickness of the spacer, measured in the direction of the length of the line, will be increased, whereas when the wedge occupies its opposite position, as shown in Figure 18, the effective thickness of the spacer is at its minimum. The body of the spacer is adapted to enter one of the spaces or pockets between the adjacent bars 5 of the magazine, the fin or tongue $s'$ passing beneath and being held by the resilient portion 7 of an adjacent retaining spring. By this arrangement, each magazine will contain a font or set of matrices arranged in radiating relation and any one of the matrices or the spacer may be removed from the magazine by an outward sliding movement beyond the periphery of the magazine and returned to the magazine by a movement which will push the matrix or spacer radially inward into its respective space or pocket.

The magazines are mounted in a row, one beside the other and on a common axis, as before stated, and they are spaced apart axially for a distance sufficient to enable the magazines to rotate individually or relatively to one another, without interference. Preferably, the magazines are rotatably supported by a suitable number or sets of rollers 8, three of these sets of rollers being shown in the present instance, which are spaced preferably at equal angles about the axis of the magazines, and the rollers of each set are individually rotatable on a supporting shaft 9, the end of these shafts being mounted in a pair of end plates 10 which are provided with lugs 11, by which they are bolted or otherwise secured immovably to the top of the frame 2. In order to facilitate removal of one set of magazines and the insertion of another set of magazines, the ends of the supporting shafts 9, which rest in the end plates 10, may be formed eccentrically with respect to the axes of rotation of the rollers, the shafts being set so that the rollers occupy their outermost positions when the magazines are in place and being rotatable to move the axes of rotation of the rollers inwardly, when it is desired to remove or insert magazines. The rollers are preferably flanged, as shown, to provide circumferential ribs 12, it being understood that the inner circumferences of the annular members or rings 4 rest on the surfaces of the rollers between the flanges of adjacent rollers and that the flanges will occupy positions between adjacent magazines and will thereby serve to space the magazines and to maintain them in properly spaced relation. The end plates 10 are rigidly but detachably united by tie members 13 which extend across the space formed within the annular magazines and are bolted or otherwise detachably secured to the end plates.

By the construction just described, it will be understood that each of the magazines is individually rotatable to bring a selected matrix or a spacer therein, to the assembling point. Different means may be employed for causing rotation of the different magazines to bring the selected matrices or the spacers to the assembling point, as desired, the periphery of each magazine being provided in the present instance with gear teeth 14 which are adapted to mesh with gears 15 which are individually rotatable on a shaft 16, the latter being supported in a bracket 17 bolted or otherwise secured to the frame 2, each gear 15 having fixed thereto a gear pinion 18 which meshes with a reciprocatory rack 19, these racks being connected, for example, to a suitable keyboard mechanism, which, however, is not claimed herein and hence will not be herein illustrated and described.

The present invention provides means for removing the selected matrices or spacers from the magazines, whereby they may be received by a matrix-gatherer, and after the line has been assembled and justified in the matrix-gatherer, the line is presented by the matrix-gatherer to the casting mechanism, whereby the type slug is cast therefrom. The means preferably used for removing the matrices or spacers from the magazines, comprises a series of fingers 20 which are secured in suitably spaced relation to a rail 21, these fingers and the rail 21 forming, in effect, a comb, the fingers of which are spaced to pass between the magazines and through the matrix spaces or pockets therein. Normally, the pocket or space 22 of each magazine, which is of extra width, as shown, as compared with the matrix and spacer-containing pockets, is unoccupied by a matrix or spacer and is positioned in the line of movement of the comb. However, any selected matrix or the spacer in each magazine may be brought into the line of movement of the respective finger or prong of the comb, by rotating such magazine to the proper extent and in the operation of the machine, the several magazines in use are rotated to bring the selected matrices and spacers into line with the respective fingers or prongs of the comb, while the comb is in its retracted position, as is illustrated in Figure 7, after which the comb is reciprocated or moved outwardly toward the peripheries of the magazines, the prongs or fingers of the comb passing outwardly between the magazines and through the pockets or spaces containing the selected matrices or spacers, the selected matrices or spacers being thereby forced outwardly and thus removed from the magazines. This comb may be actuated in different ways. Preferably and as shown, it comprises a frame 22 which is contained in the space formed within the magazines, and the bar 21 forms a part of such frame. The frame is provided with bearing shoes 23 which are guided to reciprocate in a direction diametrically of the magazines by guides 24 which are formed in the end plates 10. A shaft 25 extends through the frame 22 and also through slots 26 in the end plates 10, and the ends of this shaft 25 are pivotally connected by links 27 to the upper ends of a pair of levers 28, the latter being mounted to swing on co-axial pivots 29 fixed in the lower portion of the frame 2. Each of the levers 28 is provided with a cam 30 (Fig. 26), these cams being similar and mounted to revolve in unison on a cam shaft 31, each lever 28 having a roller or projection 32 arranged to follow a groove 33 formed in its respective cam, whereby the levers 28 will swing to and fro in unison, at appropriate intervals in the operation of the machine, it being evident from the shape of the cam groove 33 (Fig. 26) that during part of the revolution of the cam shaft 31, the comb will be reciprocated in a direction to push the matrices and spacers from the magazines and during another portion of the rotation of said cam shaft, the comb will be retracted or turned inwardly to clear the magazines.

The present invention provides a gatherer which receives the matrices and spacers from the different magazines, assembles these matrices and spacers into a line, with the bodies of the matrices and spacers in contact, presents the line to the mold and between vise jaws, and justifies the line for the casting of a type slug therefrom. The gatherer is mounted adjacent to the peripheries of the magazines and when in its matrix-receiving position it is in alinement with the comb, so that when the comb operates to remove the selected matrices and spacers from the magazines, the gatherer will receive the matrices and spacers. Preferably and as shown, the gatherer comprises a table 34 (Figs. 10–14) which is formed at one end with a head 35 which contains a groove or channel 36 in its upper side. This groove or channel is of a length corresponding substantially with the axial length of the magazines and it has a wall 37 which is formed with slots 38 which correspond in number and spacing with the magazines, the gatherer and magazines being so mounted that when the gatherer is in matrix-receiving position, these slots 38 will be alined with the fins or tongues $m^2$ or $s'$ of the matrices or spacers in the respective magazines and which have been selected and brought to the assembling position in front of the ejecting comb. The channel or groove 36 is of a width somewhat greater than the length of the fins or tongues on the matrices and spacers, so that when the latter have been received by the gatherer, they may be shifted in a direction longitudinally of this groove or channel, in order to bring the bodies of the matrices and spacers into contacting relation, it being understood that the slots 28 are spaced in accordance with the spacing of the magazines and that when the matrices and spacers are first received by the gatherer, the bodies of the matrices and spacers will be separated. The means for receiving and gathering together the matrices and spacers comprises preferably two sets of matrix-receivers, these sets of matrix-receivers being contained in the respective ends of the channel or groove 36, as will be clear from Figures 22 and 23. Each matrix-receiver comprises a flat plate 39 which extends longitudinally of the channel 36 and parallel with its bottom, and an upturned portion 40 having resilient jaws 41 which have a normal tendency to close, although they are capable of receiving and frictionally holding the fin or tongue of a matrix or spacer between them. The plates 39 and upturned portions 40 of the matrix-receivers are of graduated lengths, the plate 39 and upturned portion 40 of the lowermost matrix-receiver being both of maximum length, while these portions of the remaining matrix-receivers of the set are of regularly decreasing length, the matrix-receivers composing each set being in nested relation, as is shown in Figure 22. The lengths of the upturned portions 40 of the matrix-receivers are so proportioned that when the ends of these plates are brought against the end-piece 42 which closes the end of the channel 36, the matrix-receiving jaws 41 of all of the matrix-receivers will be in alinement with the slots 38 through which the fins or tongues of the matrices or spacers pass while being transferred to or from the gatherer. By this construction, the matrix-receivers may all be positioned to correctly receive a group of matrices and spacers from the magazines, and after these matrices have been assembled into a compact line and used in casting a type slug, they may be spread or separated to their initial spacing, thus bringing the fins or tongues on the matrices or spacers into alinement with the slots 38, thus enabling the matrices and spacers to be removed from the gatherer and returned to their respective magazines.

Simple and efficient means is provided by the present invention for gathering the matrices together into a compact line preparatory to a casting operation and for spreading or separating the matrices preparatory to their return to the magazines. Preferably and as shown, the longitudinal plates 39 of the matrix-receivers are formed with longitudinal slots 43, the slot in the lowermost matrix-receiver being of maximum length, while the slots in the remaining matrix-receivers regularly diminish in length to an extent equal to the spacing between the matrix-receiving jaws 41, when the matrix-receivers are separated or spread apart, as is shown by the dotted lines in Figure 22. This is a characteristic of the matrix-receivers in both ends of the channel 36. The matrix-receivers are actuated to gather together the matrices and spacers and to separate or spread them apart, by bars 44 which extend upwardly through longitudinal slots 45 in the bottom of the head 35, and through the slots 43 in the respective sets of matrix-receivers, the upper ends of these bars having heads 46 fixed thereon above the respective sets of matrix-receivers and in alinement with the row of matrix-receiving jaws 41. These bars 44 which operate loosely in the slots 43 of the matrix-receivers are movable in opposite directions longitudinally of the channel 36. When they are separated to their extreme extent, as is indicated by the dotted lines in Figure 22, the outer ends of the slots 43 in the matrix-receivers of the respective sets, will be in engagement with the corresponding bar 44 and, in consequence, all of the matrix-receivers will be retracted with their outer ends resting against the end-piece 42 of the gatherer and the matrix-receiving jaws of the matrix-receivers will be positioned in alinement with the respective slots 38. After a group of matrices has been introduced into the gatherer, the bars 44 are moved toward one another, the heads 46 thereon picking up the matrix-receivers successively by the engagement of these heads with the outermost matrix-receivers, the continued approaching movements imparted to these outermost matrix-receivers causing them to pick up successively and to gather together the intermediate matrix-receivers, in consequence of which the bodies of the matrices contained in the different matrix-receivers will be brought into contact to form a compact line, as is shown by the full lines in Figure 22. The heads 46 on the bars 44 which are in substantial alinement with the jaws 41 which contain the fins or tongues on the matrices and spacers, are adapted to compress these jaws 41 and the fins or tongues on the matrices and spacers with sufficient firmness to bring the bodies of the matrices and spacers into contact and to maintain them in such relation until they are received between the vise jaws, after which the line is justified to expand it to the line measure as determined by the space between the vise jaws, after which a slug may be cast from the line of matrices or spacers without leakage of the molten metal between the matrices and spacers. After the cast has been made, the bars 44 recede toward the ends of the channel 36, they picking up the matrix-receivers successively, by the impinging of these bars against the outer ends of the slots 43 therein, and this continues until the ends of the plates 39 of the matrix-receivers abut against the end-piece 42 of the channel 36, at which time, as previously pointed out, the fins or tongues of the matrices or spacers will be positioned in alinement with the slots 38.

It will usually happen that the aggregate thickness of the bodies of the matrices selected for the left-hand matrices (Fig. 22) in composing one line, will vary from the aggregate thickness of the bodies of the matrices selected for the same matrix-receivers in composing other lines. Normally the lowermost matrix-receivers occupy a central or substantially central position in the length of the channel 36, but when the line of matrices and spacers have been gathered together into a compact line, under the conditions stated, the increased thickness of the bodies of the matrices contained in the left-hand set of matrix-receivers (Fig. 22) will crowd the lowermost matrix-receiver or receivers in the left-hand end of the channel 36 (Fig. 22), toward the right-hand end of such channel, in consequence of which the lowermost matrix-receiver or receivers in the right-hand end of the channel (Fig. 22) will be pushed toward the right, as is shown diagrammatically in Fig. 23. In order to enable the matrix-receivers to equalize and thus accommodate themselves to the condition described, the end-piece 42 which closes the right-hand end of the gatherer (Figs. 22 and 23), is provided with a plate 47 which is capable of displacement beyond the right-hand end of the channel 36, under a thrust imparted to it by the lowermost matrix-receiver or receivers in the right-hand end of the channel 36. As shown, this plate is fixed to a pair of rods 48, which rods are movable longitudinally through the lower portion of the end-piece 42 and are movable longitudinally in bores 49 formed in the head 35. These rods are encircled by compression springs 50 which bear at their outer ends against the head 42 and at their inner ends against collars 51 which are fixed on the inner ends of the rods. The end-piece 42 is rigidly fixed by screws or otherwise, to the right-hand end of the head 35 and the springs 48 will normally hold the plate 47 against the outer side of the end-piece 42. If, however, the matrix-receivers in the right-hand end of the channel 36 are crowded toward the right by the matrix-receivers in the left-hand end of said channel, the right-hand ends of the plates 39 of the matrix-receivers in the right-hand end of the channel 36 will be pushed outwardly beyond the right-hand end of the channel 36 and against the plate 47, and this plate will move outwardly against the action of the springs 48, in order to accommodate the equalizing action of the two sets of matrix-receivers. However, after the cast has been made from the line of matrices and the bars 44 have spread apart, the springs 48 will return the plate 47 to its normal position against the outer side of the end-piece 42, thus insuring proper registration of the matrix-receiving jaws 41 of the lowermost matrix-receivers in the right-hand end of the channel 36 with the slots 38.

The bars 44 may be operated by different mechanisms. As shown in the present instance, and as will be understood from Figures 12, 13, 14 and 22, each of these bars is attached to a rack bar 52 which is guided to reciprocate in the head 35 of the gatherer and a pinion 53 is arranged to mesh with each rack bar, the pinions being carried by shafts 54 which are journaled in bearings 55 on the underside of the gatherer, and the opposite ends of the shafts 54 are provided with bevel gears 56 which cooperate with bevel gears 57. The bevel gears 57 are mounted on alined shafts 58 which are journaled in bearings 59 on the underside of the gatherer, and means is provided for driving these shafts, one of the shafts being driven frictionally in order that the extent to which the bars 44 are brought together may be governed by the aggregate thickness of the bodies of the matrices and spacers contained in the line and over-motion may be compensated for. Preferably and as shown, the shaft 58 for actuating the right-hand matrix-receivers (Figs. 22 and 23) is provided with a friction clutch which comprises a collar 60 which is splined on the shaft and has a serrated clutch face to cooperate with a driving pinion 61 which is mounted loosely on the shaft, a compression spring 62 being arranged to bear against the collar 60 to force its clutch face into engagement with the companion clutch face on the pinion 61, and nuts or other adjusting means 63 being provided on the shaft to vary the power of the spring 62, and in consequence, the degree of force which the clutch is capable of transmitting to the shaft from the pinion. The shaft 58 for actuating the left-hand matrix-receivers (Figs. 22 and 23) has a pinion 61 fixed to it so that its degree of rotation is constant, so that the left-hand end of the line (Fig. 22) will always be located at the same point relatively to the mold. The pinions 61 are rotated in unison and they may be driven in different ways. As shown in Figures 1, 3, 5 and 6, each pinion cooperates with a gear section 64 formed on an arm which is pivoted at 66 on the frame 3, the arms 65 being located toward opposite sides of the frame 3, as is shown in Figure 3, and each arm is connected to a rod 67, at the point 68, the rod 67 having a roller or projection 69 which travels in a groove 70 formed in a cam 71, the two cams 71 being fixed on a cam shaft 72 which is journaled in the frame 3 and the cam grooves 70 of these cams being shaped to simultaneously swing the arms 65 in one direction to cause the matrix-receivers to gather together the matrices in the gatherer preparatory to a casting operation, and during another portion of the rotation of the cam shaft 72, these cams will swing the arms 65 in a reverse direction to cause spreading of the matrix-receivers preparatory to the return of the matrices to the magazine.

The matrices and spacers, after a casting operation has been performed, are removed from the gatherer and returned to their proper pockets or spaces in the respective magazines, by a slide which is shown particularly in Figures 10, 11, 12 and 24. This slide comprises a main slide member 73, which has a dove-tail or other suitable form of groove on its underside to cooperate with a correspondingly shaped rib 74 an the upper side of the table 34 composing the gatherer, and the slide also embodies a supplemental slide member 75 which has a dovetail or other suitable form of rib 75' to cooperate with a correspondingly shaped groove in the upper side of the slide member 73, it being understood that by this construction, the slide, as a whole, may be reciprocated relatively to the table 34 of the gatherer, in which case the slide members 73 and 75 operate in unison, and also the slide member 75 may reciprocate independently of the slide member 73, for a purpose that will hereinafter appear. The slide members 73 and 75 have a compression spring 76 interposed between them, and one of the slide members, the slide member 73 in the present instance, is provided with a pin 77 which projects through and is relatively movable longitudinally in a slot 78 formed in the other slide member 75. In consequence, the spring 76 acts normally to hold the slide members 73 and 75 in their normal position, with the pin 77 bearing against the end of the slot 78, the pin and slot connection between the slide members, however, permitting the slide member 75 to be advanced independently of the slide member 73. The slide member 75 carries on its forward end a blade 79 which is preferably of a width corresponding to the width of the gatherer, and this blade operates in a plane immediately above the head 35 of the gatherer and above which the bodies of the matrices and spacers contained in the channel 36, project, so that the matrices and spacers contained by the gatherer will be in the path of movement of the blade 79, when the latter is advanced. Figure 11 shows diagrammatically the relation of the parts when the matrices and spacers contained in the gatherer are in readiness to be returned to the magazines. The return of the matrices and spacers is effected by the forward or left-hand stroke of the slide, the edge 80 of the blade 79 coming against the ends of the bodies of the matrices and spacers in the gatherer and the continued advance of the slide pushes the matrices and spacers forward, the fins or tongues on the matrices and spacers passing through the slots 38 which are then positioned in alinement with the matrix-receivers in the gatherer, and the final portion of the advance of the slide carries the matrices and spacers into pockets in the magazines. In order to avoid upward or angular displacement of the matrices during their transfer from the magazines to the gatherer, the forward or operative ends of the fingers 20 comprising the comb which transfers the matrices and spacers from the magazine to the gatherer, may be reversely beveled to form ribs or points 81 thereon, and the corresponding ends of the bodies of the matrices and spacers may be recessed to conform with the ribbed or pointed ends of the fingers of the comb, for the purpose of insuring rectilinear movement of the matrices and spacers as they are pushed ahead of the comb.

The gatherer is movably mounted to enable it to occupy a position in cooperative relation with the magazines, so that it may receive matrices and spacers therefrom or return matrices and spacers thereto, and it may occupy a position in which it presents the composed and justified line of matrices and spacers to the casting mechanism. Preferably and as shown, the gatherer is pivoted so that it may swing into these respective positions at appropriate times, the body 34 of the gatherer being provided with trunnions 82 which project from its opposite sides and which are preferably concentric with the axes of the shafts 58, these trunnions being journaled in bearings 83 which are formed in brackets 84, the latter being conveniently bolted or otherwise fixed to the frame 3. The gatherer table 34 also has a pair of pinions 85 which are fixed to rotate therewith. Different means may be provided for swinging the gatherer on its trunnions at appropriate intervals. Preferably and as shown particularly in Figures 1 and 29, a pair of levers 86 are pivoted at 87 and are provided at their upper ends with gear segments 88 which cooperate with the respective pinions 85, the levers 86 receiving a to or fro movement at the proper time from a pair of cams 89 fixed on the cam shaft 72, each lever 86 having a link 90 pivotally connected thereto and having a fork 91 which straddles the shaft 72, and carrying a roller or projection 92 which follows an appropriately shaped cam groove 93 in the face of the cam, it being understood that the swing of the levers 86 in one direction will operate through the pinions 85 and gear segments 88 to swing the gatherer from a horizontal, or matrix-receiving or discharging position, to a vertical or casting position, and vice versa.

The slide comprising the slide members 73 and 75 may also be reciprocated in different ways, it being preferable however, to provide operating means for this slide which will maintain its operative connection therewith, notwithstanding the swinging shifting movements of the matrix-gatherer. Preferably and as shown in Figures 24, 27 and 28, the slide member 73 is provided with a pair of alined rollers or projections 94 at its opposite sides, and these rollers are fitted into arcuate grooves 95 formed in the inner side of a pair of levers 96, the latter being pivoted on an axis 87 and controlled or actuated by a pair of cams 98 fixed on the cam shaft 31. As shown, a link 99 is pivotally connected to each lever 96, its inner end being forked to straddle the cam shaft 31 and this link carries a roller or projection 100 which follows an appropriately shaped cam groove 101 in the face of the cam. The link 99 in the present instance is connected to the lever 96 by a plate 102 which is fixed to the link and enters a slot 103 in the lever 96, a pin 104 serving as a pivot to connect the link and lever. When the levers 96 are in their normal position, in which position the matrix-transfer slide will be in its retracted position, as shown in Figure 11, the arcuate grooves 95 in which the rollers or projections 94 on the matrix-transfer slide operate, will be concentric with the trunnions or axis about which the matrix-gatherer swings, and hence the swinging of the matrix gatherer to and from the casting position will take place while the matrix-transfer slide thereon remains motionless.

The movement of the slide member 75 independently of the slide member 73 is utilized to effect justification of the line, and this occurs when the matrix-gatherer is swung into its vertical or casting position, as is indicated by the dotted lines in Figure 11 and is shown particularly in Figures 29 to 34. Justification of the line is effected by pushing up the wedges $s^3$ of the spacers to expand them, thus expanding the line to fill the space between the vise jaws. These wedges $s^3$ of the spacers will occupy the position shown in Fig. 18, when the spacers are received by the matrix-gatherer, the spacers then being contracted or of minimum effective thickness and, in consequence, when the matrix-gatherer swings upwardly into the casting position, these wedges $s^3$ of the spacers contained in the line will hang downwardly from the line, and the lower or thicker ends of the wedges $s^3$ will be in line with the blade 79 in the slide member 75. The matrix-receivers in the gatherer operate to gather together the matrices and spacers into a compact line to bring the bodies thereof into contacting relation, preferably during the swing of the matrix-gatherer from its matrix-receiving position to the casting position, as will be hereinafter pointed out, and upward movement of the slide member 75, while the matrix-gatherer is in its upper or casting position, will bring the blade 79 thereon into engagement with the downwardly hanging wedges $s^3$ of the spacers, and, in consequence, the spacers will be expanded to fill out the line after being introduced between the vice jaws and thus justify it properly. Different means may be employed for actuating the slide member 75 to push upwardly the wedges of the spacers, the means shown particularly in Figure 30 for performing this function comprising a lever 105 which is pivoted at 106 to a part of the frame 3, the opposite end of this lever having a seat 107 which will be in line with a roller or projection 108 on the lower end of the slide member 75 when the matrix-gatherer has been swung into its vertical or casting position. This lever 105 is connected to a link 109, the lower end of which is preferably forked to straddle the cam shaft 72 and this link carries a roller or projection 110 which travels within a cam race 111 formed in a cam 112, the latter being fixed on the cam shaft 72. This cam race 111 is formed preferably with a gradually sloping notch or depression 113 and an immediately following abruptly formed recess or depression 114, so that during the rotation of the cam 112 in the direction indicated by the arrow, in Figure 30, the roller 110 will first enter the recess or depression 113 by a gradual movement, in consequence of which the justifying lever 105 will gently press up the slide member 75 to take up the slack in the line of matrices, following which the roller or projection 110 will drop suddenly into the abruptly formed recess or depression 114, in consequence of which a hammer tap or impact will be imparted by the justifying lever 105 to the wedges which will force the wedges up firmly to lock the line solidly between the vise jaws. A spring 115 serves to actuate the justifying lever 105, it acting constantly to force this lever upwardly but is controlled by the roller or projection 110 and the cam race 111.

Means is provided for accurately alining the matrices in order that the characters borne by the matrices may be accurately alined. In the present instance, the matrix-alining means also serves to accurately position the matrices relatively to the mold in which the type slug is to be cast. This alining device is shown particularly in Figures 33 and 34, it comprising an alining bar 116 which is fitted to slide vertically in a frame 117 which is located preferably below the mold, this alining bar being, for example, held in place by screws 118 which fit in vertical slots formed in the alining bar, and the alining bar has a foot 119 which extends through an opening 120 in the frame 117 and is provided with a beveled or wedged surface 121 on its underside. Compression springs 122 contained in the frame 117 and bearing on the foot 119 of the alining bar, serve to normally hold the alining bar in its lowermost position, the upper edge 123 of the alining bar, which constitutes the alining surface, being then retracted to insure clearance between it and the lugs $m^3$ of the matrices, and the lugs $s^2$ of the spacers, when the line of matrices and spacers is brought into position against the mold. A wedge 124 having a beveled or wedging surface 125 on its upper side, is movable in the opening 120 in the frame 117 and cooperates with the beveled or wedged surface 121 on the alining bar, so that when this wedge 124 is retracted, as is shown in Fig. 33, the alining bar will be in its lower or inoperative position, and when this wedge 124 is shifted toward the left or into the position shown in Fig. 34, it forces the alining bar upwardly, bringing its upper or alining edge 123 against the lower sides of the lugs on the matrices and spacers, thereby bringing all of the matrices into alinement. The alining bar is preferably so constructed that its foot 119 will come up solidly against the frame 117, when the alining bar has been shifted to its extreme position, the alining bar then acting as a gage to insure the positioning of the matrix characters at the proper elevation relatively to the slug casting cavity in the mold.

The casting mechanism employed may be of any suitable or well known kind. In the present instance, it is shown generally as consisting of a mold composed of upper and lower members 126 and 127, the member 127 being set in the lower portion of the frame 117, while the upper member 126 is carried by a slide 128 which is mounted to reciprocate horizontally within the upper portion of the frame 117. These oppositely movable mold members carry the vise jaws 226 and 227, and hence these vise jaws will be closed and opened respectively by the approaching and receding movements of the mold members. The lower mold section 127 is plain or unrecessed, and hence forms the lower wall of the slug-casting cavity 129, while the upper mold member or section 126 is formed with a recess 130 which forms the top wall and the two end walls of the slug-casting cavity, the mold members or sections, when in superposed relation, as shown in Figure 24, cooperating to form the mold cavity, and when the upper section 126 is shifted toward the right or into the dotted line position shown in Figure 24, the lower side of the type slug cast in the mold will be uncovered and the slug may be readily ejected from the mold cavity by an ejector 131 which extends downwardly through the top of the mold section 126, the ejector being forced downwardly by a pin 132 to cause ejection of the slug. The upper side of the slide 128 which carries the upper mold section 126, is preferably beveled, as at 133, to cooperate with a correspondingly beveled surface 134 in the upper portion of the frame 117, in order that the upper mold section will be forced downwardly into close engagement with the lower mold section 127, when the upper mold section is brought into its casting position. The slide 128, which carries the upper mold section, is preferably guided at one end by a bar 135 which is provided with a rack 136, this rack cooperating with a pinion 137 on a shaft 138, this shaft being journaled in brackets on one side of the frame 3 and provided at its opposite end with a pinion 139 which cooperates with a vertically reciprocable rack 140. The rack 140 reciprocates vertically in guides 141 attached to or forming part of the frame 3 and it carries at its lower end a roller or projection 142 which bears on the cam-shaped periphery of the cam 71, a spring 143 acting to retain the roller 142 in contact with the periphery of the cam. The peripheral cam surface of the cam 71 is so shaped that the rack 140 will be reciprocated at appropriate intervals during the operation of the machine, whereby the slide 128 will be shifted toward the left to bring the mold sections into co-operative relation preparatory to a casting operation, and after the cast has been made, the slide 128 will be shifted toward the right in Figure 24 to permit ejection of the slug from the upper mold section. The slug may be received in different ways, a slug-receiver 144 being shown in the present instance, which is slidable horizontally on a guide plate 145 below the path of the upper mold section, and means is provided for reciprocating the upper mold section 126 and the slug-receiver 144 in reverse directions, so that they may be brought into superposed relation, as shown by the dotted lines in Figure 24, to enable a slug to be ejected from the upper mold section and deposited into the slug-receiver, and their position may be reversed so that the upper mold section may return to casting position and the slug-receiver may advance the slug for trimming or other operations. As shown, the slide 128 and the slug-receiver are connected to a chain, or equivalent member 146 at opposite sides of an idler sprocket 147, over which the chain is passed, one end of the chain winding upon a take-up drum 148 which is always under the tension of a spring 149 (Fig. 25), it being understood that with such an arrangement, the chain will be maintained under constant tension, but the take-up spring will enable the chain to operate in conformity with the movements of the mold slide 128.

The metal pot 150 employed in injecting type metal into the mold cavity for the casting of the type slug, may be of any suitable or well known construction. The metal pot shown particularly in Figure 32 has flanges 151 which are fitted to slide in guides 152 at the top of the frame 3, so as to carry the mouth-piece 153 of the metal pot to and from engagement with the rear side of the mold. Different means may be provided for advancing and retracting the metal pot. The means shown in Figure 31 comprises a toggle 154, one end of which is attached to the metal pot and the other end of which is pivoted at 155 to a bracket 156, which is fixed to or forms part of the frame 3. A link 157 is operatively connected to the middle of the toggle, the lower end of this link being pivotally connected to a lever 158 which is pivoted on a fixed pivot 159 on the frame 3, and a roller or projection 160 is carried by the intermediate portion of this lever. This roller or projection operates in a groove 161 of a cam 162, the latter being fixed to the cam shaft 72, the cam groove 161 being so shaped that after a line of matrices and spacers has been presented to the mold and justified, the lever 158 is pulled downwardly, thereby straightening the toggle 154, in consequence of which the mouth-piece 153 of the metal pot will be forced into contact with the rear face of the mold, and after the cast has been made, the lever 158 will be pushed upwardly, thus flexing or bending the toggle, in consequence of which the metal pot will be retracted. The metal injecting means may be similar to that usually employed, the metal injecting plunger 163, as shown in Figure 32, being actuated by a lever 164 which is pivoted at one end of the metal pot, as at 165, and at its opposite end is pivotally connected to a link 166, the lower end of this link being pivotally connected to one end of the lever 167, the opposite end of which is pivoted at 159 to the frame 3, and the lever 167 carries at an intermediate point, a roller or projection 169 which is held in contact with the cam-shaped periphery 170 of a cam 171, by a spring 172. The cam 171 is fixed on the cam shaft 72 and its periphery is formed with an abrupt drop 173, this drop in the cam surface 170 reaching the roller 169 immediately after the mouth-piece of the metal pot has been forced into contact with the rear side of the mold. As a consequence, the metal injecting plunger 163 will be forced downwardly and it will inject the molten type metal into the mold cavity in the usual or well known way.

The matrix-gatherer which presents the line to the forward side of the mold, is provided with means for backing it up so it may sustain the thrust imparted to it, when the metal pot is advanced or thrust forward by the toggle 154. The backing-up means which is shown particularly in Figures 1, 2 and 26, comprises a yoke-shaped frame having arms 174 which straddle the magazines, and may be journaled on pins 175 projecting from the outer sides of the end plates 10 for the magazines, the intermediate portion 176 of this yoke-shaped frame having an edge 177, as shown in Figure 2, which is adapted to assume a position immediately behind the matrix-gatherer, after the latter has assumed its casting position. The means shown in Figure 26 for raising and lowering this backing-up device, comprises a pair of links 178 which are pivotally connected to the yoke-shaped frame at opposite ends, as appears in Figure 2, each of these links having a roller or projection 179 thereon which cooperates with the cam-shaped periphery 180 of the cam 30, the latter being fixed on the cam shaft 31, the lower end of the link being forked, as at 181, to straddle the cam shaft 31. The cam-shaped periphery 180 is so formed that it will support the backing-up device in elevated position, so that it will clear the swing of the gatherer, except during the time the gatherer is in casting position, the backing-up device being then lowered, so that it will form an abutment behind the gatherer and it will sustain the thrust imparted to the gatherer, incident to the advance of the metal pot.

The cam shafts 31 and 72 are preferably driven in unison and from the same driving shaft, for which purpose each of these cam shafts is provided with a worm wheel 182 which cooperates with a worm 183 fixed to a common longitudinally extending driving shaft 184, the latter receiving power in any suitable way, as, for example, through a suitable clutch and from a belt pulley (not shown) which may be fixed to one end of the driving shaft.

The cycle of operations occurring in the operation of a line-composing and type-casting machine constructed as hereinbefore described, is as follows: The magazines normally stand with the blank or unoccupied pockets or spaces 22 thereon in line with the matrix-transfer comb. The matrices or spacers to form the line are selected and are brought into common alinement in front of the prongs or fingers 20 of the comb by rotating the respective magazines to the required extents. Upon starting the cam shafts 31 and 72 by the engaging, for example, of a suitable clutch, as is common in typographical machines, the cam 30 on the cam shaft 31 operates to shift the cam toward the gatherer or assembler, the fingers or prongs of the comb entering the inner ends of the matrix pockets or spaces in the respective magazines and coming against the inner ends of the bodies of the selected matrices and spacers forces them outwardly from the magazines and onto the gatherer or assembler, the fins or tongues of the matrices and spacers passing through the slots 38 in the wall 37 of the gatherer, the comb serving to advance the matrices and spacers until the fins or tongues thereon are contained in the channel 36 of the gatherer. Figure 11 shows diagrammatically the manner in which the matrix-transfer is effected between the magazines and the gatherer. During this transfer of the selected matrices and spacers, it will be understood that the gatherer or assembly table is in its horizontal position, as shown by the full lines in Figure 11, and that the slide members 73 and 75 are in retracted position, as is shown by the full lines in said figure. Immediately after the transfer comb has completed the transfer of the selected matrices and spacers from the magazines to the gatherer, this transfer comb is retracted, so that the forward ends of its fingers or prongs will retract from and clear the path of movement of the gatherer. In transferring the selected spacers from the magazines to the gatherer, the corresponding prongs or fingers of the comb will engage the thinner ends of the wedges $s^3$ and these wedges will be pushed forward by the comb until the comb engages the inner ends of the bodies of the spacers, whereupon the spacers will be bodily transferred from their magazines. In this way the spacers, when they are introduced into the gatherer, preparatory to the composing of the line, will be in contracted form. Following the transfer of the selected matrices and spacers to the gatherer, the cams 89 on the cam shaft 72 operate to swing the levers 86 in a direction to rotate the gatherer from its horizontal matrix-receiving position to its vertical casting position, the gatherer being shown in the latter position by the dotted lines in Figure 11 and by the full lines in Figures 29 to 34. Coincident with the swing of the gatherer into casting position, the levers 65 are swung downwardly by the cams 71 on the cam shaft 72, the gear segments on these levers acting on the pinions 61 to rotate them concurrently to produce simultaneous movements of the racks 52 in reverse directions. The bars 44 carried by the respective racks are thus caused to approach one another and in so doing they pick up the matrix receivers successively in the respective ends of the channel 36 of the gatherer and thereby shift the matrix gatherers from the dotted-line positions into substantially the full-line positions shown in Figure 22, the group of matrices and spacers to compose the line being thereby gathered together and condensed or compacted by the approaching movements of the heads 46 until the bodies of the matrices and spacers are in contact with one another and when the line has been clamped to the desired degree, any excess movement of the arm 65 and pinion 61 which actuate the right-hand bar 44 (Figs. 22 and 23) will be taken care of by slippage of the friction clutch which is provided between such pinion and its rack-operating shaft 58. The line of matrices and spacers remains under the compression thus produced and the continuing upward swing of the gatherer brings the line into a position between the vise jaws 226 and 227 and against the face of the mold. During this upward swing of the gatherer, the backing-up device 176 is held in elevated position by the cam surface 180 on the cams 30, but after the gatherer has been brought into casting position relatively to the mold, these cam surfaces 180 permit the backing-up device to descend and to assume a position behind the gatherer, as is shown in Figures 26 and 34. Also, during the upward swing of the gatherer to bring the line into casting relation with the mold, the casting pot 150 will be in its retracted position, as is indicated by the dotted lines in Figure 31 and as shown by the full lines in Figure 33, and hence the alining bar 116 will be in its lowered position, as is shown in Figure 33. The upper edge of this alining bar will, therefore, clear with certainty the lugs $m^3$ of the matrices and the lugs $s^2$ of the spacers As the gatherer swings into its upright or casting position, the roller or projection 108 on the slide member 75, assumes a position in or immediately above the seat 107 in the justifying lever 105, the latter at this time being held retracted by the cam surface 111 of the cam 112, as is indicated by the dotted lines in Figure 30, but the continued rotation of the cam 112, following the presentation of the line to the mold, brings the recesses or depressions 113 and 114 successively into line with the roller 110, whereby the justifying lever 105 is pushed upwardly, thus forcing the slide member 75 upwardly, independently of the slide member 73, the blade 79 on the slide member 75 being thus brought into engagement with the wider ends of the wedges of the spacers which extend downwardly below the bodies of the matrices and spacers, in consequence of which the wedges are forced upwardly, first with a gentle blow and then with a sharper blow, the spacers being thereby expanded to fill out and to justify the line. The metal pot which is advanced from the dotted line to the full line position, as shown in Figure 31, to bring its mouth-piece into contact with the rear face of the mold, preparatory to a casting operation, causes the wedge 124 which, as shown, is attached to and moves with the spout of the metal-pot, to elevate the alining bar 116, the upper edge 123 of this alining bar being thus brought up against the lower edges of the rearwardly projecting lugs on the bodies of the matrices and spacers, and thereby bringing all of the matrices in the line to the same level, so that their characters will be accurately alined and will be positioned correctly in relation to the mold cavity. This forward thrust of the mouth-piece of the metal pot against the rear side of the mold, is backed-up or sustained by the member 176 which drops into a position behind the gatherer, as is shown in Figure 34. While the elements occupy this position, the plunger 163 of the metal pot is caused to descend under control of the cam 171, molten metal being thereby injected in a manner well understood into the mold cavity, thus causing a slug to be cast against the line, the slug bearing along one edge characters corresponding to the characters borne by the matrices in the line. The machine, as shown, is adapted to cast type slugs which are type-high and which are otherwise standard.

After the type slug has been cast, the metal pot is retracted, the backing-up member 176 is elevated and the gatherer is swung from its upward or casting position down to its horizontal position, as is shown by the full lines in Figure 11, the levers 65 during this return movement of the gatherer operating to reverse the position of the racks 52, thus causing the bars 44 to be shifted from the full line positions to the dotted line positions in Figure 22, the matrix-receivers being thereby restored to their initial positions with the matrix-receiving jaws 41 thereof in alinement with the respective slots 38. Following the return of the gatherer to its normal horizontal position, the levers 96 are swung toward the left in Figure 27, the slide member 73 being thereby shifted toward the left in Figures 11 and 27, carrying with it the cooperative slide member 75. The blade 79 on the end of the slide member 75 is thereby brought into engagement, first, with the wider ends of the wedges of the spacers, the continued advance of the slide member 75 causing these wedges to be pushed toward the bodies of the spacers until they are even therewith, and the further advance of the slide member 75 brings the blade 79 into engagement with the ends of the bodies of the matrices and spacers in the line and causes these matrices and spacers to be transferred from the gatherer back into the spaces or pockets in the respective magazines, from which they were previously removed. It will be understood that the comb also retracts until its fingers or prongs are entirely clear of the inner ends of the matrix-containing pockets in the magazines, and hence the magazines are then free for rotation incident to the selection of another line of matrices and spacers.

I claim as my invention:—

1. In a typographical machine, the combination of a plurality of matrix-magazines, a matrix assembler adapted to be positioned to receive matrices from the magazines, and means operative to bodily transfer a line of selected matrices from the magazines to the assembler.

2. In a typographical machine, the combination of a row of matrix-magazines, a line-receiver, and a reciprocatory member operative to transfer a line of selected matrices from the magazines to said receiver by movement of the line bodily in a direction transversely of its length.

3. In a typographical machine, the combination of a row of rotatable matrix-magazines, a matrix assembler, and means operative to bodily transfer a row of selected matrices, brought into operative relation therewith by rotation of said magazines, to said assembler.

4. In a typographical machine, the combination of a row of individually-movable, spaced matrix-magazines, a matrix assembler adapted to be positioned opposite to said magazines, and a comb having fingers movable through the spaces between the magazines and operative to transfer a line of selected matrices from the magazines to said assembler.

5. In a typographical machine, the combination of a row of rotatable axially spaced magazines having radial matrix-holding pockets, a matrix assembler, and a member having fingers operative through such pockets in the magazines and operative to transfer a line of selected matrices to said assembler.

6. In a typographical macnine, the combination of a row of matrix-magazines, a matrix-assembler, means for bodily transferring a line of selected matrices from the magazines to the assembler, and means for gathering together the line of matrices received by the assembler.

7. In a typographical machine, the combination of a plurality of matrix-magazines, and a matrix assembler adapted to receive a line of matrices from the magazines, the assembler embodying a plurality of matrix-receivers relatively movable to gather together the matrices into a compact line.

8. In a typographical machine, a line-gatherer embodying a plurality of matrix-receivers adapted to individually receive the matrices to compose a line and relatively movable to gather together such matrices to form a line.

9. In a typographical machine, a line-gatherer comprising a plurality of matrix-receivers having means for individually holding the matrices to compose a line, means for spreading said receivers to receive a line of longitudinally-spaced matrices and for contracting the receivers to gather together the matrices to form a compact line.

10. In a typographical machine, a line gatherer comprising a plurality of matrix receivers, and means for spreading said receivers to receive a line of matrices in relatively spaced relation and for shifting said receivers to progressively varying extents to gather together such matrices.

11. In a typographical machine, a line-gatherer comprising a set of matrix-receivers arranged in nested relation and having means for individually holding matrices to form a line, and means for shifting said receivers to progressively varying extents to gather together such matrices to form a compact line and for spreading apart such matrices.

12. In a typographical machine, a line-gatherer comprising a set of matrix-receivers each comprising an upstanding portion adapted to receive and hold a matrix and a longitudinally-extending portion, said matrix-receivers being arranged in nested relation with their upstanding and longitudinally-extending portions respectively in parallelism, and means cooperative with the longitudinally-extending portions of said receivers to bring the upstanding portions thereof into closely-abutting relation and for equidistantly spreading said upstanding portions.

13. In a typrographical machine, a matrix-gatherer comprising a set of matrix-receivers arranged in nested relation, each matrix-receiver comprising an upstanding portion adapted to receive and support a matrix and a longitudinally-extending portion, the longitudinally-extending portions of the matrix-receivers being superposed and slidable one on another, and means for relatively shifting the matrix-receivers to bring the upstanding portions thereof into closely-abutting relation.

14. In a typographical machine, a matrix-gatherer comprising a set of matrix-receivers having alined matrix-holders thereon, and means for relatively reciprocating said receivers to gather together and to separate the matrix-holders.

15. In a typographical machine, a matrix-gatherer comprising a set of matrix-receivers having alined matrix-holders thereon and also having longitudinally-extending slots of progressively varying lengths, and a member extending through said slots and operative to shift the matrix-receivers to gather together the matrix-holders thereon into compact relation and to spread apart said matrix-holders in definite spaced relation.

16. In a typographical machine, a matrix-gatherer comprising a table having a channel therein and slots extending through one wall of said channel and spaced longitudinally thereof, and a set of matrix-receivers adapted to individually receive and hold matrices and relatively movable longitudinally of said channel to aline their matrix-receiving portions with the respective slots and to gather together their matrix-receiving portions.

17. In a typrographical machine, a matrix gatherer to handle matrices each having a body and a fin of reduced thickness extending from an edge thereof, comprising a set of matrix-receivers having alined upstanding holders to receive the fins of the respective matrices of a line, said receivers being relatively shiftable to bring together the bodies of the matrices.

18. In a typographical machine, a gatherer for matrices each having a body and a fin of reduced thickness projecting from an edge thereof, comprising a table having a channel therein and spaced slots extending transversely through a longitudinal wall thereof, and a set of matrix-receivers contained in said channel and having upstanding matrix-holders for the respective matrices of a line, said receivers being relatively shiftable in a direction longitudinally of said channel to aline the matrix-holders thereon with said spaced slots and to gather together said matrix-holders into closely-abutting relation.

19. In a typographical machine, a matrix-gatherer comprising a table having a channel therein, a set of matrix-receivers contained in said channel and having upstanding matrix-holders to support matrices with their bodies projecting above the surface of said table, the matrix-receivers being relatively shiftable longitudinally in said channel to gather together and spread apart the matrices carried thereby, and a member movable across the top of said channel to shift the matrices in a direction transversely thereof.

20. In a typographical machine, a matrix-gatherer comprising two sets of matrix-receivers, the receivers of one set being arranged in abutting relation with those of the other set, and the receivers of each set being individually shiftable, and members cooperative with the respective sets of receivers for shifting them relatively in opposite directions.

21. In a typographical machine, a matrix-gatherer comprising a table having a channel therein, two sets of matrix-receivers contained in said channel and having alined upstanding matrix-holders for the respective matrices of a line, the matrix-receivers of one set being arranged in opposed relation with those of the other set, and the matrix-receivers of each set being relatively shiftable, means cooperative with the respective sets of matrix-receivers to shift them relatively to gather or spread a line of matrices carried thereby, and an endwise-yieldable abutment at one end of the channel to cooperate with one or more of the matrix-receivers of one set.

22. In a typographical machine, a matrix-gatherer comprising a table having a channel therein provided with a fixed abutment at one end and a yieldable abutment at its opposite end, two sets of matrix-receivers contained in said channel, the matrix-receivers of each set being relatively shiftable longitudinally of said channel, and the matrix-receivers of one set opposing those of the other set, and members operative concurrently on the matrix-receivers of both sets to force the matrix-receivers of one set against those of the other set.

23. In a typographical machine, a matrix-gatherer comprising two sets of individually shiftable opposed matrix receivers, and means for gathering together said receivers with an equalization of the movement between the receivers of both sets.

24. In a typographical machine, the combination of a matrix-gatherer comprising a plurality of matrix-receivers adapted to engage and hold the edges of the matrices, and a reciprocatory member operative to engage the ends of the matrices and to shift them edgewise in said receivers.

25. In a typographical machine, the combination of a matrix-gatherer comprising a plurality of matrix-holders adapted to engage the edges of matrices and to support them in a line, and a reciprocatory member operative to shift the matrices edgewise to introduce them into said holders.

26. In a typographical machine, the combination of a matrix-gatherer comprising a plurality of matrix-holders adapted to engage the edges of matrices to support them, and a slide operative upon the matrices to remove them edgewise from said holders.

27. In a typographical machine, the combination of a table containing a plurality of holders to receive a line of matrices and wedge-spacers, and a slide operative on the wedges of the spacers while said table is in casting position to expand the spacers and operative on the line of matrices and spacers when the table is in another position to remove the line from the table.

28. In a typographical machine, a table adapted to receive a line of matrices and spacers, and carrying a slide comprising a pair of slide members, one of which is reciprocable relatively to the other and both of which are reciprocable bodily, said table being movable into casting position and into line discharging position, means operative on the reciprocable slide member while the table is in casting position to justify the line, and means for reciprocating the slide while the table is in line-discharging position to remove the line from the table.

29. In a typographical machine, a table pivoted to swing into line-transferring position and into casting position, a slide member carried by the table and operative while the latter is in casting position to justify a line on the table, and means for actuating said slide member while said table is in line-transferring position to remove such line from the table.

30. In a typographical machine, a table pivoted to swing to and from casting position and adapted to contain a line of matrices and spacers preparatory to the swing of the table into casting position, means for introducing a line into the table, means for justifying such line while the table is in casting position, and means for removing the line after the table has been swung out of casting position.

31. In a typographical machine, the combination with a row of magazines to contain matrices and wedge-spacers and casting mechanism, of a table movable into cooperative relation with the magazines and casting mechanism, means for transferring a line of selected matrices and spacers from the magazines to the table while the wedge-spacers are in contracted condition, and means operative on the wedge-spacers while the table is in cooperative relation with the casting mechanism to expand the spacers and justify the line.

32. In a typographical machine, the combination with a slug-casting mold and cooperative metal pot movable against one side of the mold, of a table constructed to contain a line of matrices and spacers, said table being movable to bring said line against the opposite side of the mold, and means movable into and out of cooperative relation with said table for backing up said table when the metal pot is brought against the mold.

33. In a typographical machine, the combination with a slug-casting mold and a cooperative metal pot movable against the rear side of the mold, of a table adapted to contain a line of matrices and spacers, the table being mounted to swing the line against the front of the mold, and a member movable into cooperative relation with the table to back it up and sustain the thrust transmitted thereto by the metal pot.

34. In a typographical machine, a magazine comprising a member having spaced ribs thereon to form a pocket to receive the body of a matrix or spacer between them, and a yielding member overlying one of the ribs and arranged to engage and frictionally hold a fin projecting from the adjacent edge of the body of a matrix or spacer in said pocket.

35. In a typographical machine, line-justifying means comprising a justifying member adapted to act on expansible spacers in the line, and a controlling cam therefor embodying means for imparting first a gradual pressure and then an impact to the expansible spacers through the agency of said justifying member.

36. In a typographical machine, line-justifying means comprising a justifying member to act on expansible spacers in the line, and a controlling cam having successively-arranged drops therein, the first of which is gradual and another of which is abrupt, to impart successive pressure and impact-strokes to the justifying member while the latter is acting on said spacers.

37. In a typographical machine, the combination with a slug-casting mold and a table movable relatively to the mold to present a line of matrices and spacers thereto, of an alining bar with which the line cooperates when the line is presented to the mold, a metal pot movable toward the mold for injecting metal therein, and means operative by the metal pot for shifting the alining bar relatively to the mold to aline the matrices.

38. In a typographical machine, the combination with a mold and a metal pot movable to and from casting relation with the mold, and means for presenting a line of matrices and spacers to the mold, of an alining bar, and means operative coincidentally with the advance of the metal pot toward the mold for shifting the alining bar to effect alinement of the line.

39. In a typographical machine, the combination with a mold and a metal pot movable into casting relation with the mold, and means for presenting a line of matrices and spacers to the mold, of an alining bar, and means connected to the metal pot and movable in unison therewith to shift the alining bar and thus effect alinement of the line.

40. In a typographical machine, the combination with a mold, a metal pot movable against the mold, and means for presenting a line to the mold for a cast therefrom, of a wedge movable with the metal pot and operative to shift the alining bar to effect alinement of the line, In testimony whereof I have hereunto set my hand in presence of two subscribing witnesses.

ANDREW HELDRICH.

Witnesses:
A. KATZ,
I. J. BOODIS.